United States Patent
Kawahira et al.

(10) Patent No.: US 11,550,187 B2
(45) Date of Patent: Jan. 10, 2023

(54) LIQUID CRYSTAL DISPLAY DEVICE

(71) Applicant: Sharp Display Technology Corporation, Mie (JP)

(72) Inventors: Yuichi Kawahira, Mie (JP); Takako Koide, Mie (JP); Masahiro Hasegawa, Mie (JP); Akira Sakai, Mie (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/671,913

(22) Filed: Feb. 15, 2022

(65) Prior Publication Data

US 2022/0276537 A1     Sep. 1, 2022

(30) Foreign Application Priority Data

Feb. 19, 2021   (JP) .............................. JP2021-025503

(51) Int. Cl.
*G02F 1/13363* (2006.01)
*G02F 1/1335* (2006.01)

(52) U.S. Cl.
CPC .. *G02F 1/133634* (2013.01); *G02F 1/133531* (2021.01); *G02F 1/133567* (2021.01); *G02F 2413/01* (2013.01); *G02F 2413/12* (2013.01)

(58) Field of Classification Search
CPC ........... G02F 1/13363; G02F 1/133631; G02F 1/133632; G02F 1/133633; G02F 1/133634; G02F 1/133635; G02F 1/133637
See application file for complete search history.

(56) References Cited

U.S. PATENT DOCUMENTS

| | | | |
|---|---|---|---|
| 11,391,874 B1* | 7/2022 | Seuh | G02B 5/223 |
| 2010/0231831 A1 | 9/2010 | Miyatake et al. | |
| 2012/0229735 A1 | 9/2012 | Miyatake et al. | |
| 2021/0199879 A1* | 7/2021 | Robinson | G02F 1/133536 |

FOREIGN PATENT DOCUMENTS

JP     2013-130882 A     7/2013

* cited by examiner

*Primary Examiner* — Alexander P Gross
(74) *Attorney, Agent, or Firm* — ScienBiziP, P.C.

(57) ABSTRACT

The liquid crystal display device includes: a first polarizer having a first transmission axis; a liquid crystal panel; a second polarizer having a second transmission axis; a biaxial retarder having a slow axis parallel to the second transmission axis; a third polarizer having a third transmission axis parallel to the second transmission axis; and a backlight, a back side polarizer portion that includes the second polarizer, the biaxial retarder, and the third polarizer satisfying the following formula (1): $\Delta YI_2 = YI_2' - YI_2 < 0$ (1) wherein $YI_2'$ represents a yellowness index in observation from an oblique direction, $YI_2$ represents a yellowness index in observation from a front direction, and $\Delta YI_2$ represents a difference between $YI_2'$ and $YI_2$, wherein the front direction represents a direction at a 0° polar angle and the oblique direction represents a direction at a 60° polar angle and a 45° azimuth.

6 Claims, 16 Drawing Sheets

FIG.14
Polar angle dependence of chromaticity in observation at 45° azimuth
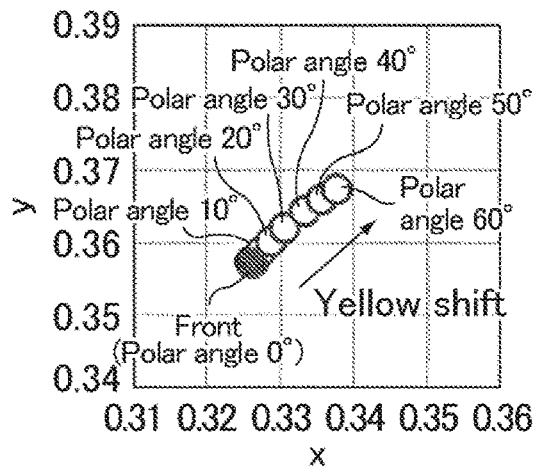
Example 3-2
(I) Liquid crystal panel portion
$+$ Offset
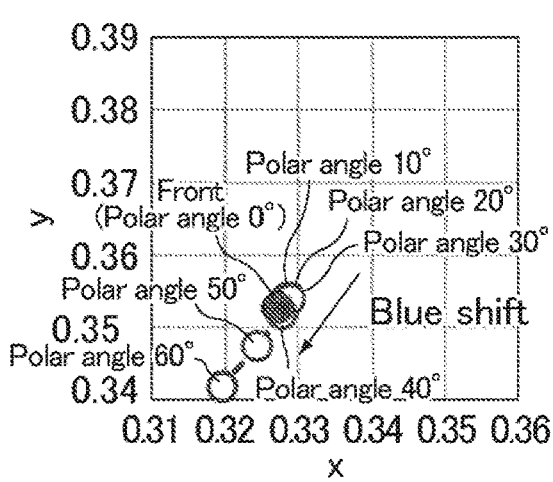
Example 3-2
(II) Back side polarizer portion
$=$
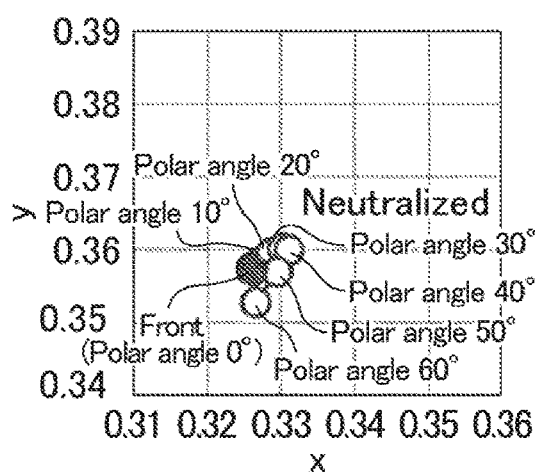
Example 3-2
Entire liquid crystal display device (I + II)

LIQUID CRYSTAL DISPLAY DEVICE

CROSS-REFERENCE TO RELATED APPLICATIONS

The present application claims priority under 35 U.S.C. § 119 to Japanese Patent Application No. 2021-025503 filed on Feb. 19, 2021, the contents of which are incorporated herein by reference in their entirety.

BACKGROUND OF THE INVENTION

Field of the Invention

The present invention relates to liquid crystal display devices. Specifically, the present invention relates to a liquid crystal display device including multiple polarizers on the back surface side of a liquid crystal panel.

Description of Related Art

Liquid crystal display devices are display devices that utilize a liquid crystal composition for display. The typical display mode thereof is applying voltage to a liquid crystal layer containing a liquid crystal composition sealed between paired substrates to change the alignment state of liquid crystal molecules in the liquid crystal composition according to the applied voltage, thereby controlling the amount of light transmitted. These liquid crystal display devices, having characteristics such as thin profile, light weight, and low power consumption, have been used in a broad range of fields.

As a technique relating to liquid crystal display devices, JP 2013-130882 A discloses a transmissive liquid crystal display device sequentially including a light source (BL), a reflective linearly polarizing layer (Pr1), a birefringent layer (A) having certain optical properties, a light-source-side absorptive linearly polarizing layer (P1), a liquid crystal cell (LC), a viewing side linearly polarizing layer (P2), and a viewing side light diffusing layer (D2), the birefringent layer having a certain retardation property.

BRIEF SUMMARY OF THE INVENTION

A typical liquid crystal display device unfortunately causes yellow discoloration in white display in observation from an oblique direction. The reason for such yellow discoloration of the liquid crystal display device in observation from an oblique direction is presumably as follows. That is, a typical liquid crystal layer gives a positive wavelength dispersion (a shorter wavelength provides a greater $\Delta n$ (refractive index anisotropy) and a longer wavelength provides a smaller $\Delta n$, i.e., a shorter wavelength provides a greater birefringence and a longer wavelength provides a smaller birefringence). Thus, in observation of the liquid crystal display device in white display from an oblique direction, a cell gap increases in appearance, which reduces the transmittance in the blue wavelength band because of its liquid crystal retardation $\Delta$nd exceeding $\lambda/2$, but increases the transmittance in the green and red wavelength bands because of its liquid crystal retardation $\Delta$nd not exceeding $\lambda/2$. This disorders the white balance, resulting in yellow discoloration.

In the transmissive liquid crystal display device of JP 2013-130882 A, the birefringent layer is set to have a thickness retardation Rth within the range of 250 nm≤Rth≤6000 nm and an in-plane retardation Re within the range of 10 nm≤Re≤100 nm and thus provides too large an NZ coefficient (an index showing a ratio of Rth to Re, NZ=Rth/Re+1/2). Thus, in a back side polarizer portion including the light-source-side absorptive linearly polarizing layer (P1), the birefringent layer (A), and the reflective linearly polarizing plate (Pr1), yellow discoloration is significant in observation at an oblique azimuth such as a 45° azimuth or a 135° azimuth. In combination with yellow discoloration caused by a liquid crystal panel portion including the viewing side linearly polarizing layer (P2), the liquid crystal cell (LC), and the light-source-side absorptive linearly polarizing layer (P1) in observation at an oblique azimuth such as a 45° azimuth or a 135° azimuth, yellow discoloration appears more significantly. Here, the NZ coefficient of the birefringent layer disclosed in JP 2013-130882 A is: when Re=100 nm and Rth=6000 nm, NZ=60.5; when Re=100 nm and Rth=250 nm, NZ=3.0; when Re=10 nm and Rth=6000 nm, NZ=600.5; and when Re=10 nm and Rth=250 nm, NZ=25.5.

In order to reduce yellow discoloration in observation from an oblique direction using the birefringent layer disclosed in JP 2013-130882 A, the birefringent layer is to be formed from a material giving a reverse wavelength dispersion (a shorter wavelength provides a smaller $\Delta n$ and a longer wavelength provides a greater $\Delta n$, i.e., a shorter wavelength provides a smaller birefringence and a longer wavelength provides a greater birefringence). Unfortunately, even the best performance achieved by such a technique results in a similar level of yellow discoloration to that of a typical liquid crystal display device.

The present invention has been made under the current situation in the art and aims to provide a liquid crystal display device capable of reducing yellow discoloration in observation from an oblique direction.

(1) One embodiment of the present invention is directed to a liquid crystal display device sequentially including from a viewing surface side to a back surface side: a first polarizer having a first transmission axis; a liquid crystal panel; a second polarizer having a second transmission axis; a biaxial retarder having a slow axis parallel to the second transmission axis; a third polarizer having a third transmission axis parallel to the second transmission axis; and a backlight, a back side polarizer portion that includes the second polarizer, the biaxial retarder, and the third polarizer satisfying the following formula (1): $\Delta YI_2 = YI_2' - YI_2 < 0$ (1) wherein $YI_2'$ represents a yellowness index in observation from an oblique direction, $YI_2$ represents a yellowness index in observation from a front direction, and $\Delta YI_2$ represents a difference between $YI_2'$ and $YI_2$, wherein the front direction represents a direction at a 0° polar angle and the oblique direction represents a direction at a 60° polar angle and a 45° azimuth with the polar angle defined to be 0° in a direction parallel to a normal line of the liquid crystal panel and the azimuth defined to be 0° in a direction parallel to the slow axis of the biaxial retarder.

(2) In an embodiment of the present invention, the liquid crystal display device includes the structure (1), and a liquid crystal panel portion including the first polarizer, the liquid crystal panel, and the second polarizer satisfies the following formula (2): $\Delta YI_1 = YI_1' - YI_1 > 0$ (2) wherein $YI_1'$ represents a yellowness index in observation from the oblique direction, $YI_1$ represents a yellowness index in observation from the front direction, and $\Delta YI_1$ represents a difference between $YI_1'$ and $YI_1$.

(3) In an embodiment of the present invention, the liquid crystal display device includes the structure (2), and the liquid crystal panel has an in-plane retardation of 330 nm or more.

(4) In an embodiment of the present invention, the liquid crystal display device includes the structure (1), (2), or (3), and the liquid crystal display device satisfies the following formula (3): $\Delta YI_3 = YI_3' - YI_3 < 6.7$ (3) wherein $YI_3'$ represents a yellowness index in observation from the oblique direction, $YI_3$ represents a yellowness index in observation from the front direction, and $\Delta YI_3$ represents a difference between $YI_3'$ and $YI_3$.

(5) In an embodiment of the present invention, the liquid crystal display device includes the structure (4), and the difference value $\Delta YI_3$ satisfies the following formula (4): $|\Delta YI_3| = |YI_3' - YI_3| < 6.7$ (4).

(6) In an embodiment of the present invention, the liquid crystal display device includes the structure (1), (2), (3), (4), or (5), a ratio Re450/Re550 representing a ratio of an in-plane retardation Re of the biaxial retarder at a wavelength of 450 nm to an in-plane retardation Re thereof at a wavelength of 550 nm satisfies the following formula (5-1), a ratio Re650/Re550 representing a ratio of an in-plane retardation Re of the biaxial retarder at a wavelength of 650 nm to an in-plane retardation Re thereof at a wavelength of 550 nm satisfies the following formula (5-2), and an in-plane retardation Re (nm) of the biaxial retarder and a thickness retardation Rth (mn) thereof satisfy the following formulas (6-1) to (6-3), the formulas being:

$$1.00 < Re450/Re550 < 1.02 \quad (5\text{-}1)$$

$$0.98 < Re650/Re550 < 1.00 \quad (5\text{-}2)$$

$$Rth \geq -5.754 \times Re + 1622 \quad (6\text{-}1)$$

$$Rth \geq 0.5 \times Re \quad (6\text{-}2)$$

$$Rth \leq -1.521 \times Re + 765.7 \quad (6\text{-}3).$$

The present invention can provide a liquid crystal display device capable of reducing yellow discoloration in observation from an oblique direction.

BRIEF DESCRIPTION OF THE DRAWINGS

FIG. 14 includes graphs showing polar angle dependence of chromaticity in 45°-azimuth observation of a liquid crystal panel portion, a back side polarizer portion, and an entire portion of a liquid crystal display device Example 3-2.

DETAILED DESCRIPTION OF THE INVENTION

Figure 1:
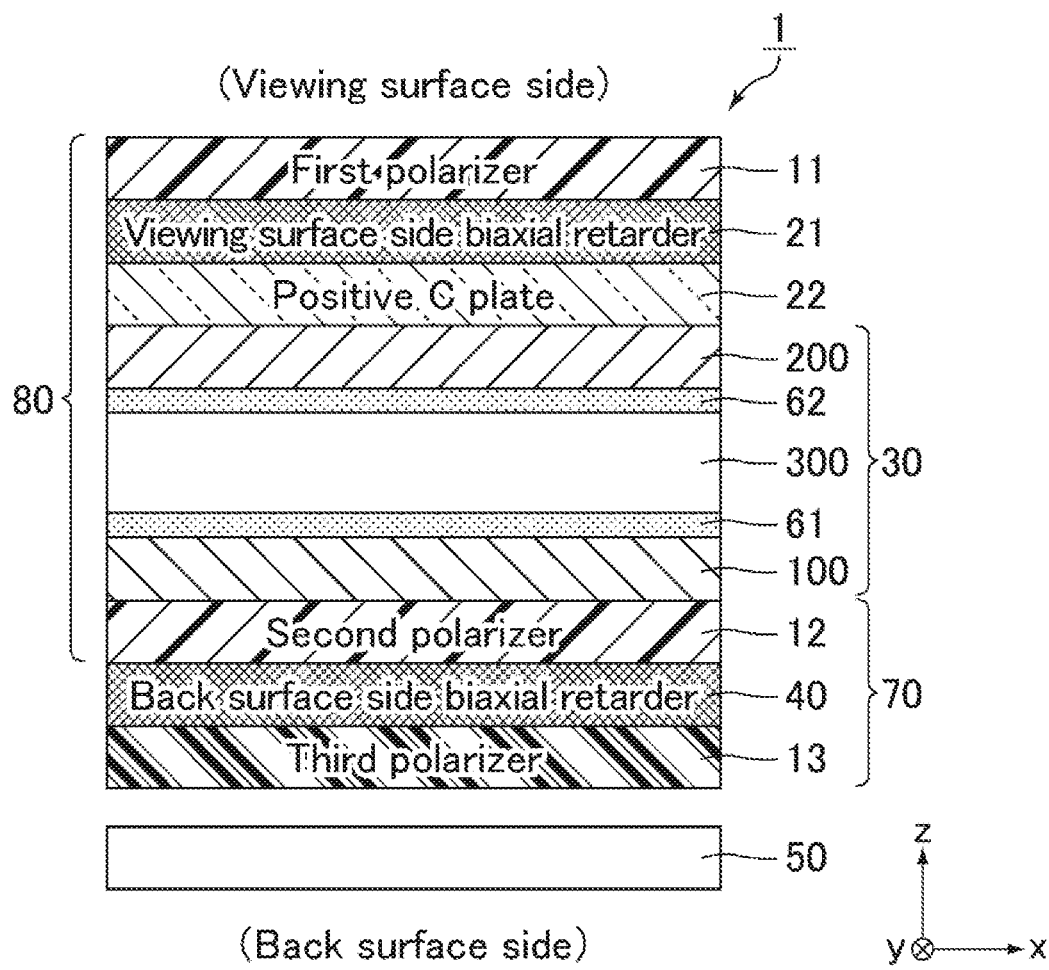
FIG. 1 is a schematic cross-sectional view of a liquid crystal display device according to an embodiment.

The present invention is described below in more detail based on embodiments with reference to the drawings. The embodiments, however, are not intended to limit the scope of the present invention.

Term Definition

Herein, a polarizer means a polarizer having a function of extracting polarized light vibrating in a specific direction only (linearly polarized light) from unpolarized light (natural light), partially polarized light, or polarized light, and is distinguished from a circular polarizer (a circularly polarizing plate). Unless otherwise noted, a "polarizer" herein indicates an element having a polarizing function and does not include any protective film. An absorptive polarizer means a polarizer that absorbs light vibrating in a specific direction and transmits polarized light vibrating in the perpendicular direction to the specific direction (linearly polarized light). A reflective polarizer means a polarizer that reflects light vibrating in a specific direction and transmits polarized light vibrating in the perpendicular direction to the specific direction (linearly polarized light).

Herein, an in-plane retardation Re is defined by $Re = (ns - nf)d$. A thickness retardation Rth is defined by $Rth = \{nz - (nx + ny)/2\}d$. A coefficient NZ (biaxial order parameter) is defined by $NZ = (ns - nz)/(ns - nf)$. A symbol ns indicates a greater value of nx and ny, and nf indicates a smaller value thereof. Symbols nx and ny indicate principal refractive indices of a birefringent layer (including a retarder and a liquid crystal panel) in an in-plane direction, nz indicates a principal refractive index in an out-of-plane direction, i.e., a direction perpendicular to the surface of the birefringent layer, and d indicates the thickness of the birefringent layer.

The following indices are herein used for showing the wavelength dispersion characteristics of a birefringent layer: Re450/Re550, which is a ratio of an in-plane retardation Re at a wavelength of 450 nm to an in-plane retardation Re at a wavelength of 550 nm; and Re650/Re550, which is a ratio of an in-plane retardation Re at a wavelength of 650 nm to an in-plane retardation Re at a wavelength of 550 nm. Re450 represents an in-plane retardation Re at a wavelength of 450 nm, Re550 represents an in-plane retardation Re at a wavelength of 550 nm, and Re650 represents an in-plane retardation Re at a wavelength of 650 nm.

Optical parameters such as principal refractive indices, retardation values, and coefficient NZ values are herein measured at a wavelength of 550 nm unless otherwise noted.

A birefringent layer herein indicates an optically anisotropic layer and conceptually includes a retarder and a liquid crystal panel. A birefringent layer means a layer in which one of the in-plane retardation Re and the absolute value of the thickness retardation Rth is 10 nm or more, preferably 20 nm or more.

Herein, a viewing surface side means a side closer to the screen (display surface) of a liquid crystal display device, and a back surface side means a side further from the screen (display surface) of a liquid crystal display device.

Herein, a polar angle θ means an angle between an object direction (e.g., measurement direction) and the direction parallel to the normal line of a liquid crystal panel (the screen of the liquid crystal panel). In other words, the direction parallel to the normal line of the liquid crystal panel corresponds to a polar angle of 0°. The direction parallel to the normal line is also referred to as a normal direction. An azimuth means a direction of an object direction projected on a liquid crystal panel (the screen of the liquid crystal panel) and is expressed by an angle (azimuth angle) formed with a reference azimuth. Herein, the reference azimuth (an azimuth of 0°) is set at the direction parallel to the slow axis of the biaxial retarder. In other words, the direction parallel to the slow axis of the biaxial retarder corresponds to an azimuth of 0°. Angles and azimuths (azimuth angles) have positive values in a counterclockwise direction and negative values in a clockwise direction. The counterclockwise and clockwise directions mean rotation directions when the screen of a liquid crystal panel is viewed from the viewing surface side (front side). An angle indicates a value measured in a planar view of a liquid crystal panel. A state in which two straight lines (including axes, directions, and ridge lines) are perpendicular to each other means that the lines are perpendicular to each other in a planar view of a liquid crystal panel.

An axis azimuth herein means the azimuth of the transmission axis of a polarizer, the azimuth of the slow axis of a liquid crystal layer, or the azimuth of the slow axis of a retarder, unless otherwise noted.

Hereinafter, an embodiment of the present invention is described. The embodiment, however, is not intended to limit the scope of the present invention. The designs in the embodiment may appropriately be modified within the spirit of the present invention.

Embodiment

FIG. 1 is a schematic cross-sectional view of a liquid crystal display device according to an embodiment. A liquid crystal display device 1 of the present embodiment is a transmissive liquid crystal display device that includes a stack sequentially including from the viewing surface side to the back surface side a first polarizer 11, a viewing surface side biaxial retarder 21, a positive C plate 22, a liquid crystal panel 30, a second polarizer 12, a back surface side biaxial retarder 40 as the biaxial retarder, a third polarizer 13, and a backlight (BL) 50 as shown in FIG. 1.

The first polarizer 11 includes a first transmission axis and a first absorption axis perpendicular to the first transmission axis or a first reflection axis perpendicular to the first transmission axis. The second polarizer 12 includes a second transmission axis and a second absorption axis perpendicular to the second transmission axis or a second reflection axis perpendicular to the second transmission axis. The third polarizer 13 includes a third transmission axis and a third absorption axis perpendicular to the third transmission axis or a third reflection axis perpendicular to the third transmission axis.

The second polarizer 12 and the third polarizer 13 are arranged in the parallel Nicols. In other words, the second transmission axis (or the second absorption axis or the second reflection axis) of the second polarizer 12 and the third transmission axis (or the third absorption axis or the third reflection axis) of the third polarizer 13 are parallel to each other. Specifically, the axes form an angle within the range of 0°±10° (preferably within the range of 00°±5°).

A back side polarizer portion 70 including the second polarizer 12, the back surface side biaxial retarder 40, and the third polarizer 13 satisfies the following formula (1):

$$\Delta YI_2 = YI_2' - YI_2 < 0 \quad (1)$$

wherein $YI_2'$ represents the yellowness index in observation from an oblique direction, $YI_2$ represents the yellowness index in observation from a front direction, and $\Delta YI_2$ represents the difference between $YI_2'$ and $YI_2$, wherein the front direction represents a direction at a 0° polar angle and the oblique direction represents a direction at a 60° polar angle and a 45° azimuth with the polar angle defined to be 0° in a direction parallel to the normal line of the liquid crystal panel and the azimuth defined to be 0° in a direction parallel to the slow axis of the biaxial retarder. Such an embodiment can reduce yellow discoloration in observation of the liquid crystal display device 1 from an oblique direction.

Hereinafter, components of the liquid crystal display device of the present embodiment are specifically described.

The back side polarizer portion 70 sequentially includes from the viewing surface side to the back surface side the second polarizer 12 having the second transmission axis, the back surface side biaxial retarder 40, and the third polarizer 13 having the third transmission axis parallel to the second transmission axis. The back side polarizer portion 70 thus can use collimation in which distribution of light emitted from the backlight 50 is selectively focused in the normal direction, the second transmission axis direction (the third transmission axis direction), and the second absorption axis direction or the second reflection axis direction (the third absorption axis direction or the third reflection axis direction) (cross light distribution). As for light entering from other oblique directions such as 45°, 135°, 225°, and 315° azimuths, i.e., the directions that each form an angle of about 45° with the second transmission axis direction (third transmission axis direction), the back surface side biaxial retarder 40 changes the polarization state of light having passed through the third polarizer 13 and causes a low transmittance observed. Here, the expression "two axes (directions) are perpendicular to each other" herein means that the angle (absolute value) formed by the two axes is within the range of 90°±3°, preferably within the range of 90°±1°, more preferably within the range of 90°±0.5°, particularly preferably at 90° (perfectly perpendicular to each other). Also, the expression "two axes (directions) are parallel to each other" herein means that the angle (absolute value) formed by the two axes is within the range of 0°±3°, preferably within the range of 0°±1°, more preferably within the range of 0°±0.5°, particularly preferably at 0° (perfectly parallel to each other). Examples of the axes include the transmission axis of a polarizer and the slow axis of a retarder.

The back side polarizer portion 70 including the second polarizer 12, the back surface side biaxial retarder 40, and the third polarizer 13 functions as an optical louver and thus is also referred to as a polarizing louver. The back side polarizer portion 70 is usually attached to the liquid crystal panel 30 with an adhesive layer (not shown).

The first polarizer 11 and the second polarizer 12 are arranged in the crossed Nicols or parallel Nicols. In order to achieve a high contrast ratio, the first polarizer 11 and the second polarizer 12 are preferably arranged in the crossed Nicols. The expression "the first polarizer 11 and the second polarizer 12 are arranged in the crossed Nicols" means that the first transmission axis (or the first absorption axis or the first reflection axis) of the first polarizer 11 and the second transmission axis (or the second absorption axis or the second reflection axis) of the second polarizer 12 are perpendicular to each other. The expression "the first polarizer 11 and the second polarizer 12 are arranged in the parallel Nicols" means that the first transmission axis (or the first absorption axis or first reflection axis) of the first polarizer 11 and the second transmission axis (or the second absorption axis or the second reflection axis) of the second polarizer 12 are parallel to each other.

The first polarizer 11, the second polarizer 12, and the third polarizer 13 may be formed from any material, may have any optical characteristics, and may each be a polarizer such as an absorptive polarizer or a reflective polarizer, for example. Specific examples thereof include an absorptive polarizer obtained by aligning dichroic anisotropic molecules such as an iodine complex adsorbed on a polyvinyl alcohol (PVA) film, a reflective polarizer obtained by uniaxially stretching a coextruded film including two resins (e.g., APCF available from Nitto Denko Corporation and DBEF available from 3M Japan Limited), and a reflective polarizer obtained by aligning thin metal wires in a periodic pattern (i.e., wire grid polarizer). A stack including an absorptive polarizer and a reflective polarizer may also be used.

Among these, an absorptive polarizer is suitable for the first polarizer 11 and the second polarizer 12, and a reflective polarizer is suitable for the third polarizer 13. In this case, the first polarizer 11 has a first transmission axis and a first absorption axis perpendicular to the first transmission axis, the second polarizer 12 has a second transmission axis and a second absorption axis perpendicular to the second transmission axis, and the third polarizer 13 has a third transmission axis and a third reflection axis perpendicular to the third transmission axis.

The polarizing louver may include a plurality of third polarizers 13 stacked. In this case, the third transmission axes of the third polarizers 13 are set at substantially the same azimuth.

In order to assure the mechanical strength and the humidity and heat resistance, a protective film (not shown) such as a triacetyl cellulose (TAC) film may be laminated on at least one of the viewing surface side or the back surface side of each of the first polarizer 11, the second polarizer 12, and the third polarizer 13. The protective film is attached to the first polarizer 11, the second polarizer 12, and the third polarizer 13 with any appropriate bonding layer (not shown) in between.

A protective film that also functions as the back surface side biaxial retarder 40 may be used. In other words, the back surface side biaxial retarder 40 may be a protective film such as a TAC film (wherein one of the in-plane retardation Re and the absolute value of the thickness retardation Rth is 10 nm or greater).

The "bonding layer" herein means a layer that bonds the surfaces of adjacent optical elements and thereby integrates them with a practically sufficient adhesiveness in a practically sufficient bonding time. Examples of the material for forming the bonding layer include adhesives and anchor coating agents. The bonding layer may have a multilayer structure in which an anchor coating layer is formed on the surface of a bonding target and a bonding agent layer is formed on the anchor coating layer. The bonding layer may be a thin layer invisible with the naked eye.

Similarly to the "bonding layer", the "adhesive layer" herein is a layer that bonds the surfaces of adjacent optical elements and integrates them with a practically sufficient adhesiveness in a practically sufficient bonding time. The difference from the bonding layer is that the layer itself has stickiness and elasticity and thus can bond the objects with a slight pressure applied for a while at room temperature without a chemical reaction caused by a factor such as water, a solvent, or heat. Another difference is that objects attached by a bonding layer cannot be separated, while objects attached by an adhesive layer can be separated. Examples of the material for forming the adhesive layer include resins including acrylic resin, silicone resin, and urethane resin and rubber materials.

The retarder including the viewing surface side biaxial retarder 21 and the positive C plate 22 compensates for the viewing angle of a fringe field switching (FFS) mode liquid crystal display device.

Examples of the material for forming each of the viewing surface side biaxial retarder 21 and the back surface side biaxial retarder 40 include, but are not limited to, stretched polymer films, liquid crystal materials with fixed alignment, and thin plates formed from inorganic materials. Each of the viewing surface side biaxial retarder 21 and the back surface side biaxial retarder 40 may be formed by any method. In formation using a polymer film, for example, the retarder can be formed by a method such as solvent casting or melt extrusion. Multiple retarders may be simultaneously formed by coextrusion. The retarder(s) may be non-stretched or stretched as long as the desired retardation is exhibited. Any stretching method may be used, including inter-roll tensile stretching, inter-roll compression stretching, tenter horizontal uniaxial stretching, oblique stretching, biaxial stretching in the vertical and horizontal directions, and special stretching in which a heat-shrinkable film is stretched under the shrinkage strength of the film. In formation using a liquid crystal material, a method can be employed which includes applying a liquid crystal material to a substrate film after alignment treatment and fixing the alignment, for example. The retarder(s) may be formed by other methods as long as the desired retardation is exerted, such as a method including no particular alignment treatment on a substrate film and a method including fixing the alignment of a liquid crystal material film, separating the liquid crystal material from a substrate film, and transferring the liquid crystal material to another film. Furthermore, a method may be employed which includes no step for fixing the alignment of a liquid crystal material. In formation using a non-liquid crystal material, methods similar to those using a liquid crystal material may be employed.

Examples of the positive C plate 22 include a film obtained by biaxially stretching a film, which contains as a component a material having a negative natural birefringence, in the vertical and horizontal directions, and a film to which a liquid crystal material such as a nematic liquid crystal material is applied.

When the azimuth is defined to be 0° in a direction parallel to the slow axis of the back surface side biaxial retarder 40, the first transmission axis of the first polarizer 11 can have any appropriate azimuth, and the azimuth is preferably set within the range of 90° 3°, more preferably within the range of 900±1°, still more preferably within the range of 90°±0.5°, particularly preferably at 90°. The azimuth of the second transmission axis of the second polarizer 12 and the azimuth of the third transmission axis of the third polarizer 13 are independently set within the range of 0°±3°, preferably within the range of 0°±1°, more preferably within the range of 0°±0.5°, particularly preferably at 0°.

The slow axis of the viewing surface side biaxial retarder 21 and the slow axis of the back surface side biaxial retarder 40 are preferably perpendicular to each other. The azimuth of the slow axis of the viewing surface side biaxial retarder 21 is preferably set within the range of 90°±3°, more preferably within the range of 90°±1°, still more preferably within the range of 90°±0.5°, further more preferably at 90°.

The back side polarizer portion 70 including the second polarizer 12, the back surface side biaxial retarder 40, and the third polarizer 13 satisfies the following formula (1):

$$\Delta YI_2 = YI_2' - YI_2 < 0 \quad (1)$$

wherein $YI_2'$ represents the yellowness index in observation from the oblique direction, $YI_2$ represents the yellowness index in observation from the front direction, and $\Delta YI_2$ represents the difference between $YI_2'$ and $YI_2$.

The back side polarizer portion 70 includes the second polarizer 12 and all components on the back surface side of the second polarizer 12. In other words, the back side polarizer portion 70 includes the second polarizer 12, all components between the second polarizer 12 and the third polarizer 13, and the third polarizer 13. More specifically, the back side polarizer portion 70 sequentially includes from the viewing surface side to the back surface side the second polarizer 12, the back surface side biaxial retarder 40, and the third polarizer 13.

Preferably, the liquid crystal panel portion 80 including the first polarizer 11, the liquid crystal panel 30, and the second polarizer 12 satisfies the following formula (2):

$$\Delta YI_1 = YI_1' - YI_1 > 0 \quad (2)$$

wherein $YI_1'$ represents the yellowness index in observation from the oblique direction, $YI_1$ represents the yellowness index in observation from the front direction, and $\Delta YI_1$ represents the difference between $YI_1'$ and $YI_1$. The liquid crystal display device 1, when it includes the liquid crystal panel portion 80 which gives a difference value ΔYI: satisfying the above formula (2), can particularly effectively reduce yellow discoloration in observation from an oblique direction.

The liquid crystal panel portion 80 sequentially includes from the viewing surface side to the back surface side the first polarizer 11, the liquid crystal panel 30, and the second polarizer 12. In the present embodiment, the viewing surface side biaxial retarder 21 and the positive C plate 22 are disposed between the first polarizer 11 and the second polarizer 12. The viewing surface side biaxial retarder 21 and the positive C plate 22 compensate for the viewing angle of the liquid crystal panel mainly in black display and are thus considered to less contribute to white display. The present embodiment focuses on yellow discoloration in white display so that the viewing surface side biaxial retarder 21 and the positive C plate 22 presumably give little influence on yellow discoloration in white display. Accordingly, the present embodiment focuses on the liquid crystal panel portion 80 including the first polarizer 11, the liquid crystal panel 30, and the second polarizer 12.

Preferably, the liquid crystal panel 30 has an in-plane retardation Re of 330 nm or more. Such an embodiment causes yellow discoloration in observation of the liquid crystal panel portion 80 from an oblique direction. Meanwhile, the back side polarizer portion 70 causes blue discoloration in observation from the oblique direction. Thus, the liquid crystal panel 30 having an in-plane retardation Re of 330 nm or more and including the liquid crystal panel portion 80 and the back side polarizer portion 70 in combination can effectively neutralize the color in observation from the oblique direction, to more effectively reduce yellow discoloration in observation from the oblique direction.

Preferably, the liquid crystal panel 30 has an in-plane retardation Re of 450 nm or less. Such an embodiment allows the liquid crystal panel portion 80 in observation from an oblique direction to be within the range causing yellow discoloration. When the liquid crystal panel portion 80 has an in-plane retardation Re of more than 450 nm, the chromaticity in observation from an oblique direction shifts from the yellow direction to the red direction. Furthermore, the chromaticity shifts to the blue direction as the in-plane retardation Re increases.

Preferably, the liquid crystal display device 1 satisfies the following formula (3):

$$\Delta YI_3 = YI_3' - YI_3 < 6.7 \quad (3)$$

wherein $YI_3'$ represents the yellowness index in observation from the oblique direction, $YI_3$ represents the yellowness index in observation from the front direction, and $\Delta YI_3$ represents the difference between $YI_3'$ and $YI_3$. Such an embodiment can further reduce yellow discoloration in observation of the liquid crystal display device from an oblique direction.

More preferably, the liquid crystal display device 1 satisfies the following formula (4):

$$|\Delta YI_3| = |YI_3' - YI_3| < 6.7 \quad (4)$$

wherein $YI_3'$ represents the yellowness index in observation from the oblique direction, $YI_3$ represents the yellowness index in observation from the front direction, and $\Delta YI_3$ represents the difference between $YI_3'$ and $YI_3$. Such an embodiment can reduce not only yellow discoloration but also blue tinge in observation of the liquid crystal display device 1 from the oblique direction.

Preferably, the ratio Re450/Re550 of the in-plane retardation Re of the back surface side biaxial retarder 40 at a wavelength of 450 nm to the in-plane retardation Re thereof at a wavelength of 550 nm satisfies the following formula (5-1), the ratio Re650/Re550 of the in-plane retardation Re of the back surface side biaxial retarder 40 at a wavelength of 650 nm to the in-plane retardation Re thereof at a wavelength of 550 nm satisfies the following formula (5-2), and the in-plane retardation Re (nm) and the thickness retardation Rth (nm) of the back surface side biaxial retarder 40 satisfy the following formulas (6-1) to (6-3). Specifically setting the in-plane retardation Re and the thickness retardation Rth of the back surface side biaxial retarder 40 as described above can reduce not only yellow discoloration but also blue tinge in observation of the liquid crystal display device 1 from an oblique direction.

$$1.00 < Re450/Re550 < 1.02 \quad (5\text{-}1)$$

$$0.98 < Re650/Re550 < 1.00 \quad (5\text{-}2)$$

$$Rth \geq -5.754 \times Re + 1622 \quad (6\text{-}1)$$

$$Rth \geq 0.5 \times Re \quad (6\text{-}2)$$

$$Rth \leq -1.521 \times Re + 765.7 \quad (6\text{-}3)$$

In other words, yellow discoloration in observation of the liquid crystal panel 30 from an oblique direction can be reduced by disposing between a backlight side absorptive polarizer (second polarizer 12) and a reflective polarizer (third polarizer 13) the back surface side biaxial retarder 40 (having an in-plane retardation and a thickness retardation) which is a biaxial retarder giving a positive wavelength dispersion such that the slow axis of the biaxial retarder 40 is parallel to the transmission axis of the absorptive polarizer (second polarizer 12) and the transmission axis of the reflective polarizer (third polarizer 13). With the structure in which the back surface side biaxial retarder 40 gives a wavelength dispersion that satisfies the above formulas (5-1) and (5-2) (more specifically, satisfies R450/R550=1.01 and R650/R550=0.99 based on an assumption of use of a cycloolefin polymer) and the back surface side biaxial retarder 40 has an in-plane retardation Re (nm) and a thickness retardation Rth (nm) that satisfy the above formulas (6-1) to (6-3), the portion including the absorptive polarizer (second polarizer 12), the biaxial retarder (back surface side biaxial retarder 40), and the reflective polarizer (third polarizer 13) alone causes slight blue discoloration in observation from an oblique direction. This portion thereby can offset yellow discoloration caused by the liquid crystal panel portion 80 on the viewing surface side.

As described, in the transmissive liquid crystal display device of JP 2013-130882 A, the birefringent layer has a thickness retardation Rth within the range of 250 nm≤Rth≤6000 nm and an in-plane retardation Re within the range of 10 nm≤Re≤100 nm and thus has too large an NZ coefficient (an index showing a ratio of Rth to Re, NZ=Rth/Re+½). Accordingly, in a portion including the light-source-side absorptive linearly polarizing layer (P1)/the birefringent layer (A)/the reflective linearly polarizing plate (Pr1), yellow discoloration is significant in observation from an oblique azimuth such as a 45° azimuth or a 135° azimuth. In combination with yellow discoloration caused by a portion including the viewing side linearly polarizing layer (P2)/the liquid crystal cell (LC)/the light-source-side absorptive linearly polarizing layer (P1) in observation from an oblique azimuth such as a 45° azimuth or a 135° azimuth, resulting yellow discoloration unfortunately becomes more significant.

In order to reduce yellow discoloration in observation from an oblique direction using the birefringent layer disclosed in JP 2013-130882 A, the birefringent layer is to be formed from a material giving a reverse wavelength dispersion (shorter wavelength provides a smaller birefringence and a longer wavelength provides a greater birefringence). Unfortunately, even the best performance with such a technique results in a similar level of yellow discoloration to that of a typical liquid crystal display device.

In contrast, the present embodiment gives the finding that the back surface side biaxial retarder 40 satisfying the above formulas (6-1) to (6-3) can cause blue discoloration in observation of the portion (back side polarizer portion 70) including the second polarizer 12, the back surface side biaxial retarder 40, and the third polarizer 13 from an oblique azimuth such as a 45° azimuth or a 135° azimuth, even when the back surface side biaxial retarder 40 is formed from a material giving a positive wavelength dispersion (providing a great birefringence at a short wavelength and a small birefringence at a long wavelength) and satisfying the above formulas (5-1) and (5-2). Thus, a combination with the liquid crystal panel portion 80 (the portion including the first polarizer 11, the liquid crystal panel 30, and the second polarizer 12) that usually causes yellow discoloration in observation at an oblique viewing angle can achieve the liquid crystal display device 1 capable of preventing yellow discoloration in observation from an oblique direction and reducing or preventing blue tinge.

Figure 2:
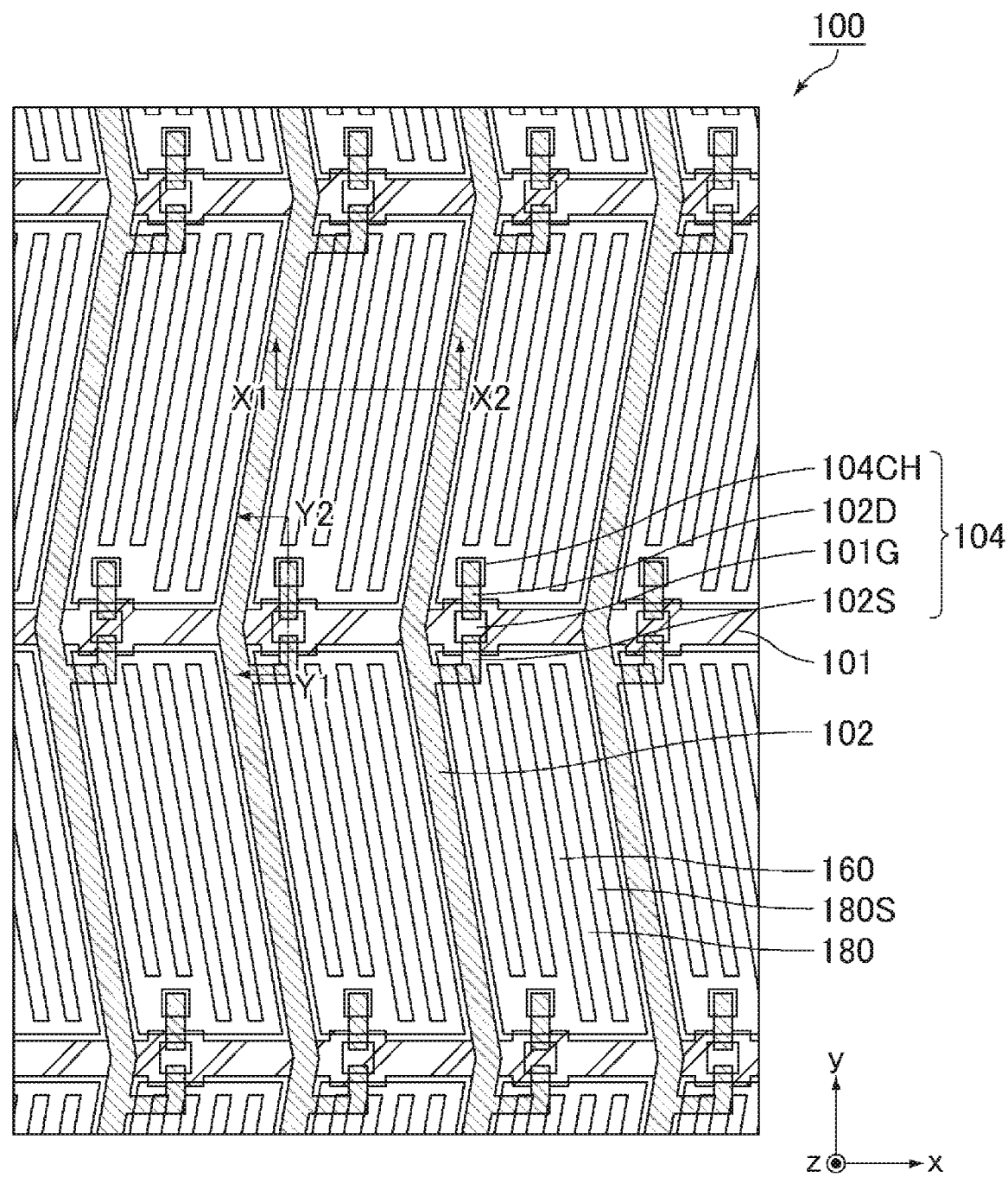
FIG. 2 is a schematic plan view showing the pixel configuration of a TFT substrate of the liquid crystal display device according to the embodiment.
Figure 3:
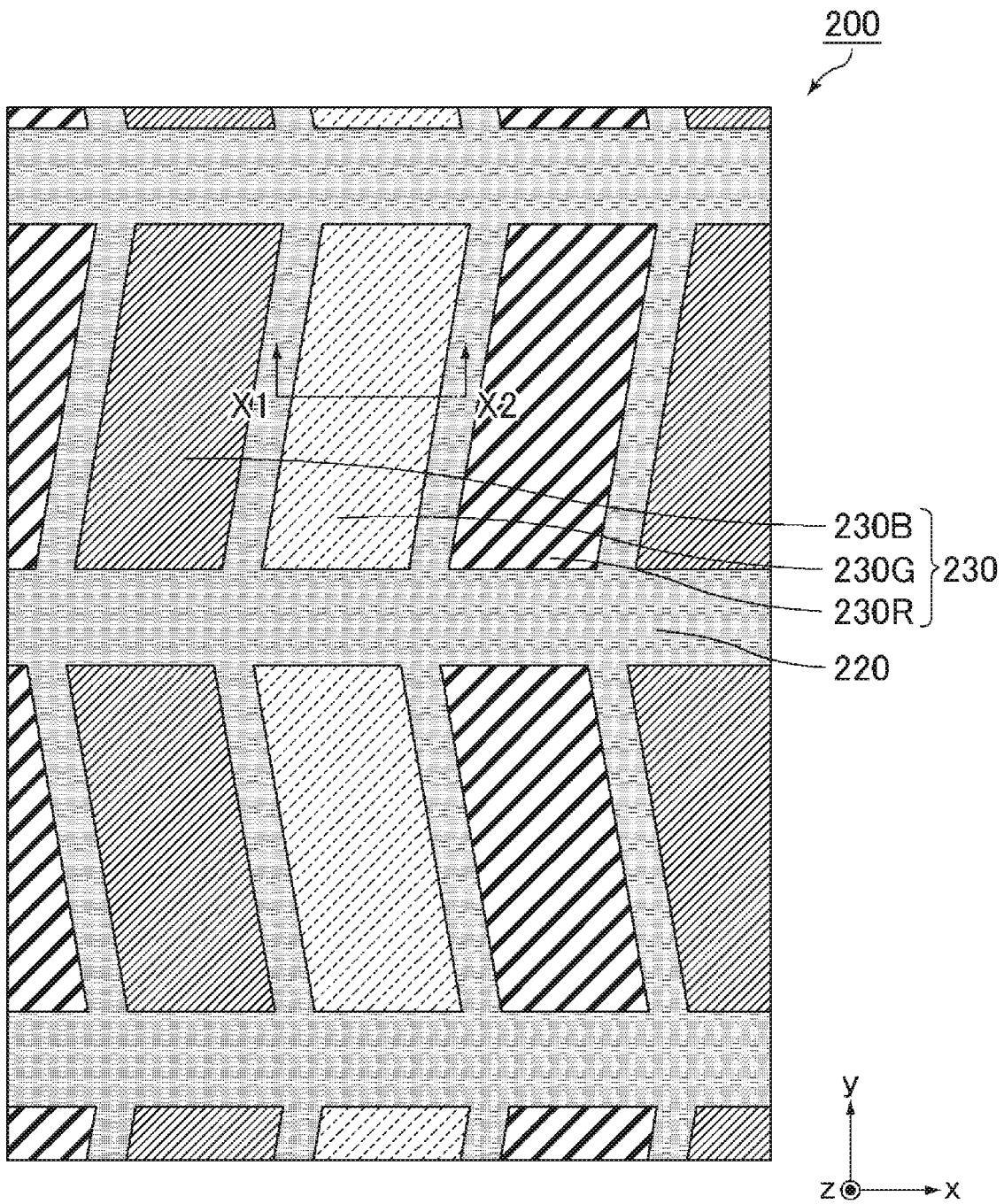
FIG. 3 is a schematic plan view showing the pixel configuration of a CF substrate of the liquid crystal display device according to the embodiment.
Figure 4:
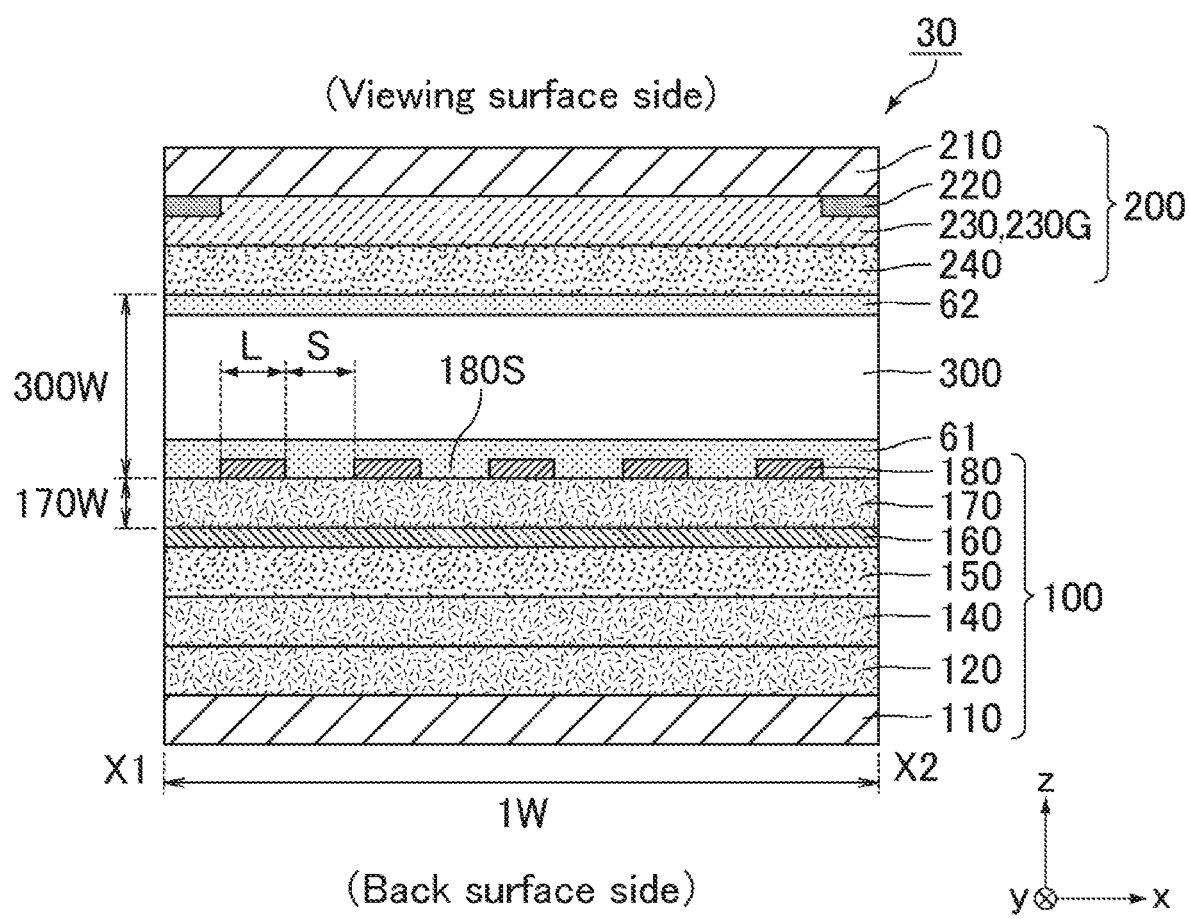
FIG. 4 is a schematic cross-sectional view of a liquid crystal panel according to the embodiment taken along the line X1-X2 in FIGS. 2 and 3.
Figure 5:
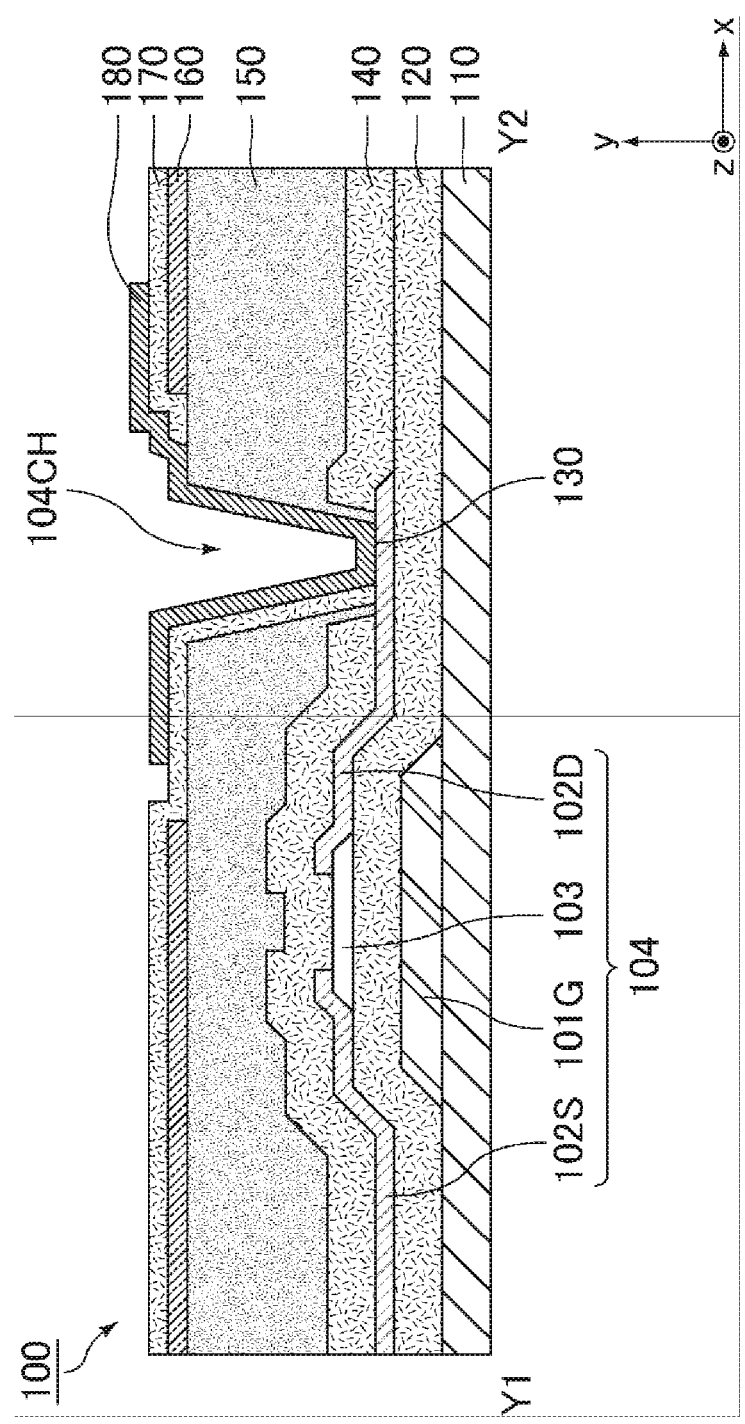
FIG. 5 is a schematic cross-sectional view of the TFT substrate taken along the line Y1-Y2 in FIG. 2.

FIG. 2 is a schematic plan view showing the pixel configuration of a TFT substrate of the liquid crystal display device according to the embodiment. FIG. 3 is a schematic plan view showing the pixel configuration of a CF substrate of the liquid crystal display device according to the embodiment. FIG. 4 is a schematic cross-sectional view of the liquid crystal panel according to the embodiment taken along the line X1-X2 in FIGS. 2 and 3. FIG. 5 is a schematic cross-sectional view of the TFT substrate taken along the line Y1-Y2 in FIG. 2. FIG. 2 and FIG. 3 are each a schematic plan view from the viewing surface side.

As shown in FIG. 4, the liquid crystal panel 30 of the present embodiment sequentially includes from the back surface side to the viewing surface side a thin-film transistor (TFT) substrate 100, a first alignment film 61, a liquid crystal layer 300, a second alignment film 62, and a color filter (CF) substrate 200.

As shown in FIG. 2 and FIG. 4, the TFT substrate 100 is provided with thin-film transistors 104 that are each a switching element for switching on and off a pixel of the liquid crystal display device 1. Although the present embodiment describes the structure of the TFT substrate 100 of the FFS mode, the present embodiment is applicable to other transverse electric field modes and thus can be applied to an in-plane-switching (IPS) mode, for example.

The TFT substrate 100 includes the TFTs 104 and sequentially includes from the back surface side to the viewing surface side a support substrate 110, gate lines, a gate insulator 120, source lines, a source insulator 140, a flattening film 150, a common electrode 160, an interlayer insulating film 170, and pixel electrodes (signal electrodes) 180. With such a structure, applying voltage between the pixel electrodes 180 and the common electrode 160 serving as paired electrodes can generate a transverse electric field (fringe electric field) in the liquid crystal layer 300. Thus, adjusting the voltage applied between the common electrode 160 and the pixel electrodes 180 can control the alignment of liquid crystals in the liquid crystal layer 300.

The TFT substrate 100 includes on the support substrate 110 parallel gate lines 101 and parallel source lines 102 intersecting the gate lines 101 via the gate insulator 120. The gate lines 101 and the source lines 102 are formed in a grid pattern as a whole so as to partition each pixel. At the intersection of each gate line 101 and each source line 102 is disposed a TFT 104 as a switching element.

As shown in FIG. 2 and FIG. 5, each TFT 104 is connected to the corresponding gate line 101 and the corresponding source line 102 among the gate lines 101 and the source lines 102 and functions as a three-terminal switch including a gate electrode 101G protruding from the corresponding gate line 101 (being part of the gate line 101), a source electrode 102S protruding from the corresponding source line 102 (being part of the source line 102), a drain electrode 102D connected to the corresponding pixel electrode 180 among the pixel electrodes 180, and a thin-film semiconductor layer 103. The source electrodes 102S and the drain electrodes 102D are disposed in the source line layer 130 having the source lines 102, and the gate electrodes 101G are disposed in the gate line layer having the gate lines 101. Each pixel electrode 180 is connected to the corresponding drain electrode 102D through a contact hole 104CH extending through the interlayer insulating film 170, the common electrode 160, the flattening film 150, and the source insulator 140.

The thin-film semiconductor layer 103 of each TFT 104 includes a high-resistant semiconductor layer formed from a material such as amorphous silicon or polysilicon and a low-resistant semiconductor layer formed from n+ amorphous silicon producible by doping amorphous silicon with an impurity such as phosphorus, for example. The thin-film semiconductor layer 103 may be an oxide semiconductor layer such as a zinc oxide layer.

Each TFT 104 has a known structure and includes components such as a channel including a semiconductor layer. The semiconductor layer is formed from an oxide semiconductor material such as indium gallium zinc oxide (IGZO).

In FIG. 4, the support substrate 110 is preferably a transparent substrate, and examples thereof include glass substrates and plastic substrates.

The gate insulator 120, the source insulator 140, and the interlayer insulating film 170 are each an inorganic insulating film, for example. Examples of the inorganic insulating film include inorganic films (relative dielectric constant $\varepsilon=5$ to 7) such as silicon nitride (SiNx) films and silicon oxide (SiO$_2$) films and multilayer films including any of these. The gate insulator 120 and the source insulator 140 are each an inorganic film formed from silicon oxide, for example. The interlayer insulating film 170 is an inorganic film formed from silicon nitride and has a film thickness 170 W of 0.2 μm, for example.

The gate line layer and the source line layer 130 each consist of a single layer of a metal such as copper, titanium, aluminum, molybdenum, or tungsten or an alloys of any of these or a multilayer of such single layers, for example. The lines and electrodes for the gate lines 101, the source lines 102, and the TFTs 104 can each be formed by forming a single layer film of a metal such as copper, titanium, aluminum, molybdenum, or tungsten or an alloy of any of these or a multilayer film of such single layers by sputtering or the like and then patterning the film by photolithography or the like. Among these lines and electrodes, those formed in the same layer may be formed from the same material to achieve efficient production.

The flattening film 150 can flatten the liquid crystal layer 300 side surfaces of the TFTs 104 in the TFT substrate 100 and may be formed from an organic insulating film (dielectric constant $\varepsilon=3$ to 4), for example. A specific example thereof is an acrylic resin film. The flattening film 150 is formed by applying a photocurable resin to a substrate, followed by ultraviolet light application and baking, for example.

The common electrode 160 is formed on almost the entire surface beyond the boundaries of the pixels, except for certain portions such as connection portions (contact holes 104CH) where the pixel electrodes 180 and the drain electrodes 102D are connected. A common signal controlled to have a constant value is supplied to the common electrode 160 so that the common electrode 160 has a constant potential.

The pixel electrodes 180 are each disposed in a region surrounded by two adjacent gate lines 101 and two adjacent source lines 102. Each pixel electrode 180 is electrically connected the corresponding source line 102 through the thin-film semiconductor layer 103 of the corresponding TFT 104. The pixel electrode 180 is set to have a potential in response to the data signal supplied through the TFT 104. Each pixel provided with a single pixel electrode 180 has a width 1 W of 28 μm, for example.

Each pixel electrode 180 is provided with parallel slits 180S. The slits 180S are inclined with respect to the initial alignment azimuth of the liquid crystal molecules. Allowing the slits 180S in the pixel electrodes 180 to have an angle with respect to the initial alignment azimuth of the liquid crystal molecules can rotate the liquid crystal molecules in a constant direction, and thereby can control the alignment of the liquid crystal molecules by voltage application. The pixel electrodes 180 have a ratio L/S of a width L and a slit width S satisfying L/S=3 μm/4 μm, for example.

Examples of the material for the common electrode 160 and the pixel electrodes 180 include indium tin oxide (ITO) and indium zinc oxide (IZO).

The first alignment film 61 and the second alignment film 62 have a function of controlling the alignment of liquid crystal molecules in the liquid crystal layer 300. When the voltage applied to the liquid crystal layer 300 is lower than the threshold voltage (including the case no voltage is applied), the alignment of the liquid crystal molecules in the liquid crystal layer 300 is preferably mainly controlled by the first alignment film 61 and the second alignment film 62 such that the major axes of the liquid crystal molecules are parallel to the first alignment film 61 and the second alignment film 62.

The expression "the major axes of the liquid crystal molecules in the liquid crystal layer 300 are parallel to the first alignment film 61 and the second alignment film 62" herein means that the tilt angle (including pre-tilt angle) of the liquid crystal molecules is 0° to 5°, preferably 0° to 3°, more preferably 0° to 1°, with respect to the first alignment film 61 and the second alignment film 62. The tilt angle of the liquid crystal molecules means the angle of the major axes (optical axes) of the liquid crystal molecules inclined with respect to the surfaces of the first polarizer 11 and the second polarizer 12.

The first alignment film 61 and the second alignment film 62 are each a layer subjected to an alignment treatment for controlling the alignment of liquid crystal molecules and may each be a typical alignment film in the field of liquid crystal display devices, such as a polyimide film. Examples of the material for the first alignment film 61 and the second alignment film 62 include polymers containing polyimide, polyamic acid, or polysiloxane as a main chain. A suitable example is a photoalignment material having a photoreactive moiety (functional group) in a main chain or a side chain.

In the liquid crystal layer 300, voltage is applied between the pixel electrodes 180 and the common electrode 160 serving as paired electrodes so that an electric field is generated in the liquid crystal layer 300. The alignment of the liquid crystal molecules is changed in response to the electric field, whereby the amount of light transmitted is controlled. When no voltage is applied (with no voltage applied) between the paired electrodes disposed in the TFT substrate 100, the liquid crystal molecules in the liquid crystal layer 300 are preferably horizontally aligned by the control forces of the first alignment film 61 and the second alignment film 62. In other words, the major axes of the liquid crystal molecules are preferably controlled to be parallel to the first alignment film 61 and the second alignment film 62. When voltage is applied (with voltage applied) between the paired electrodes, the liquid crystal molecules in the liquid crystal layer 300 are rotated in an in-plane direction in response to the transverse electric field generated in the liquid crystal layer 300. A cell gap 300 W that corresponds to the thickness of the liquid crystal layer 300 is 3 μm, for example.

The liquid crystal molecules may have a positive value or a negative value for the anisotropy of dielectric constant (Δ) defined by the following formula. The liquid crystal layer 300 of the present embodiment preferably contains liquid crystal molecules having a negative value for $\Delta\varepsilon$. Liquid crystal molecules having a positive anisotropy of dielectric constant are also referred to as positive liquid crystal, and liquid crystal molecules having a negative anisotropy of dielectric constant are also referred to as negative liquid crystal. The major axis direction of liquid crystal molecules corresponds to the slow axis direction.

$\Delta\varepsilon$=(dielectric constant in major axis direction)−(dielectric constant in minor axis direction)

The slow axis of the liquid crystal layer 300 is preferably parallel to the transmission axis of the polarizer disposed on the side with the retarder for viewing angle compensation. Thereby, the azimuth of the transmission axis of the first polarizer 11, the azimuth of the transmission axis of the second polarizer 12, and the azimuth of the slow axis of the liquid crystal layer 300 are fixed. In the present embodiment, the retarder for viewing angle compensation (retarder including the viewing surface side biaxial retarder 21 and the positive C plate 22) is adjacent to the first polarizer 11, and thus the slow axis of the liquid crystal layer 300 is preferably parallel to the transmission axis of the first polarizer 11. The slow axis of the back surface side biaxial retarder 40 is preferably parallel to the transmission axis of the second polarizer 12.

In the present embodiment, the retarder for viewing angle compensation is adjacent to the first polarizer 11. Alternatively, the retarder for viewing angle compensation may be adjacent to the second polarizer 12. In this case, the slow axis of the liquid crystal layer 300 is preferably parallel to the transmission axis of the second polarizer 12.

The CF substrate 200 sequentially includes from the viewing surface side to the back surface side a support substrate 210, a black matrix layer 220, a CF layer 230, and a flattening film 240.

The support substrate 210 is preferably a transparent substrate, and examples thereof include glass substrates and plastic substrates.

As shown in FIG. 3, the black matrix layer 220 is disposed outside the pixel regions and in a grid pattern on the support substrate 210 so as to correspond to the gate lines 101 and the source lines 102. Any material may be used for the black matrix layer 220 as long as it has light-blocking properties. Suitable examples thereof include a resin material containing a black pigment and a metal material having light-blocking properties. For example, the black matrix layer 220 is formed by applying a photosensitive resin containing a black pigment to a substrate to form a film, and subjecting the film to photolithography including steps such as exposure and development.

The CF layer 230 includes red color filters 230R, green color filters 230G, and blue color filters 230B that are arranged in a plane and are respectively partitioned by the black matrix layer 220. The red color filters 230R, the green color filters 230G, and the blue color filters 230B are each formed from a transparent resin containing a pigment, for example. Typically, each pixel includes a combination of a red color filter 230R, a green color filter 230G, and a blue color filter 230B, and a desired color is provided for each pixel by mixing light beams of the respective colors having passed through the red color filter 230R, the green color filter 230G, and the blue color filter 230B while controlling the amounts thereof.

As shown in FIG. 4, the flattening film 240 covers the liquid crystal layer 300 side surface of the CF layer 230. The flattening film 240 functions to flatten the underlayer of the second alignment film 62 when the liquid crystal layer 300 side surface of the CF layer 230 are uneven. The flattening film 240 can also prevent impurities in the CF layer 230 from eluting to the liquid crystal layer 300 side. The flattening film 240 may be formed from an organic insulating film (dielectric constant $\varepsilon$=3 to 4), for example. A specific example thereof is an acrylic resin film. The flattening film 240 is formed by applying a photocurable resin to a substrate, followed by ultraviolet light application and baking, for example.

The liquid crystal panel 30 may be of any liquid crystal mode, such as a mode that provides black display by aligning liquid crystal molecules in the liquid crystal layer in a direction perpendicular to the substrate surface or a mode that provides black display by aligning liquid crystal molecules in the liquid crystal layer in a direction parallel to the substrate surface or in a direction not parallel or perpendicular to the substrate surface. Examples of the driving mode of the liquid crystal panel include the TFT mode (active matrix mode), the simple matrix mode (passive matrix mode), and the plasma address mode. Examples of the structure of the liquid crystal panel include: a structure in which a liquid crystal layer is sandwiched between paired substrates including a substrate provided with pixel electrodes and a common electrode, and an image is displayed by applying voltage between the common electrode and the pixel electrodes to generate a transverse electric field (including a fringe electric field) in the liquid crystal layer; a structure in which a liquid crystal layer is sandwiched between paired substrates including a substrate provided with pixel electrodes and a substrate provided with a common electrode, and an image is displayed by applying voltage between the common electrode and the pixel electrodes to generate a vertical electric field in the liquid crystal layer. More specific examples of the transverse electric field mode include an FFS mode and an IPS mode, in both of which liquid crystal molecules in a liquid crystal layer are aligned in a direction parallel to the substrate surface in a no-voltage applied state. A more specific example of the vertical electric field mode is the vertical alignment (VA) mode in which liquid crystal molecules in a liquid crystal layer are aligned in a direction perpendicular to the substrate surface in a no-voltage applied state.

The backlight 50 shown in FIG. 1 may be any backlight that applies light to the liquid crystal panel 30, such as a direct-lit backlight or an edge-lit backlight. The backlight 50 of the present embodiment has a structure including a light source and a light guide plate, for example. The light guide plate may be a product typically used in the field of liquid crystal display devices. The backlight 50 may further include an optical sheet such as a diffuser or a prism sheet as appropriate.

The light source may be any product that emits light including visible light and may be one that emits light including visible light alone or one that emits light including both visible light and ultraviolet light. In order to provide color display using the liquid crystal display device 1, a light source emitting white light is suitably used. Suitable examples of the light source include cold cathode fluorescent lamps (CCFLs) and light emitting diodes (LEDs). The "visible light" herein means light (electromagnetic waves) having a wavelength of 380 nm or longer and shorter than 800 nm.

In addition to the above mentioned components, the liquid crystal display device 1 of the present embodiment may include multiple components including: external circuits such as a tape carrier package (TCP) or a printed-circuit board (PCB); an optical film such as a viewing angle widening film or a luminance improving film; and a bezel (frame). These components may be incorporated in other component(s). Description for components other than the described components is omitted because they are not limited and may be those typically used in the field of liquid crystal display devices.

Hereinafter, the present invention is described based on examples and comparative examples. The examples, however, are not intended to limit the present invention.

Comparative Example 1

Figure 6:
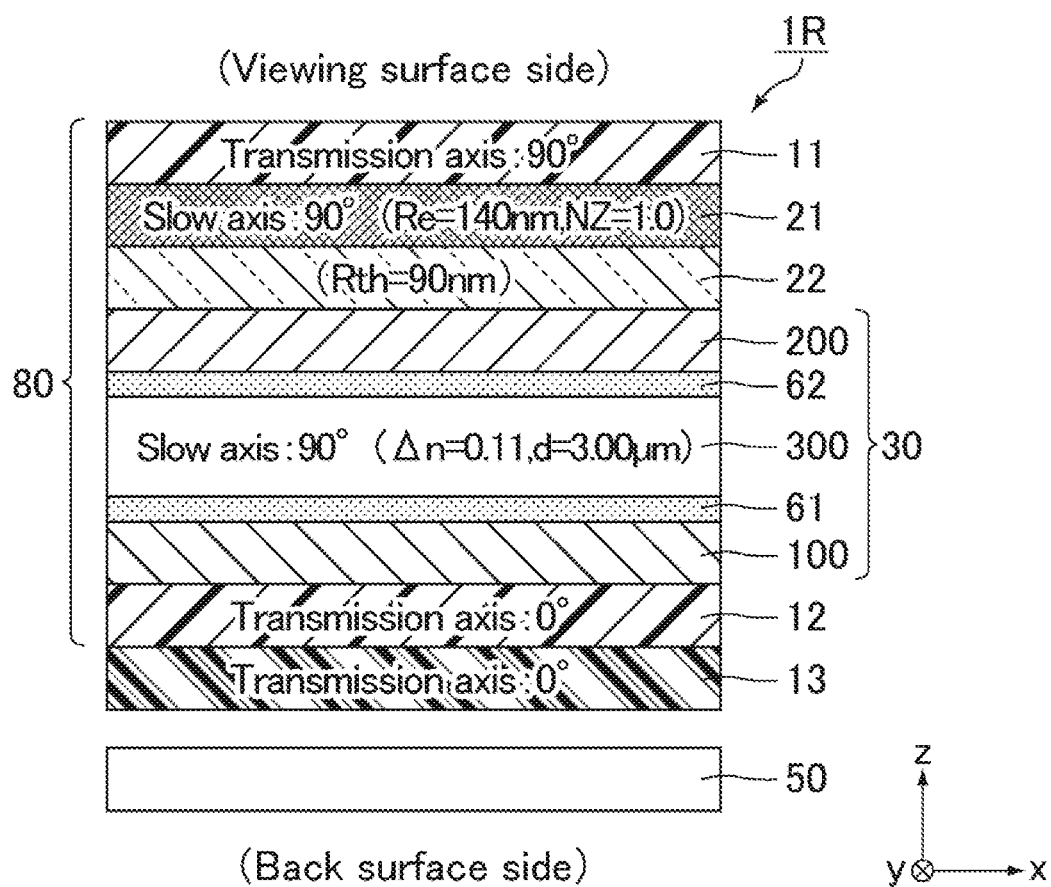
FIG. 6 is a schematic cross-sectional view of a liquid crystal display device according to Comparative Example 1.

FIG. 6 is a schematic cross-sectional view of a liquid crystal display device according to Comparative Example 1. The angles shown in FIG. 6 represent axis azimuths. A liquid crystal display device 1R of Comparative Example 1 shown in FIG. 6 was produced as a typical FFS mode liquid crystal display device. The liquid crystal panel 30 had the same structure as shown in FIGS. 2 to 5. The liquid crystal drive mode was the FFS mode. The TFTs 104 each included the thin-film semiconductor layer 103 formed from IGZO. The gate insulator 120 and the source insulator 140 were each an inorganic insulating film formed from $SiO_2$. The flattening films 150 and 240 were formed from an acrylic resin. The interlayer insulating film 170 was an inorganic insulating film formed from $SiN_x$ and having a thickness 170 W of 0.2 µm. The common electrode 160 and the pixel electrodes 180 were IGZO films. The liquid crystal layer 300 contained negative liquid crystals satisfying $\Delta\varepsilon=-3.8$ and satisfied $\Delta n=0.11$. The liquid crystal layer 300 had a cell gap 300 W of 3 µm. The ratio of the width L to the slit width S of each pixel electrode 180 satisfied L/S=3 µm/4 µm. Each pixel provided with a single pixel electrode 180 had a width 1 W of 28 µm.

The viewing surface side biaxial retarder 21 of Comparative Example 1 had an in-plane retardation Re of 140 nm and an NZ coefficient of 1.0. The positive C plate 22 had a thickness retardation Rth of 90 nm. In Comparative Example 1, the azimuth of the first transmission axis of the first polarizer 11, the azimuth of the slow axis of the viewing surface side biaxial retarder 21, and the azimuth of the slow axis of the liquid crystal layer 300 were each 90°, and the azimuth of the second transmission axis of the second polarizer 12 and the azimuth of the third transmission axis of the third polarizer 13 were each 0°.

Concerning the liquid crystal display device 1R of Comparative Example 1, the difference value $\Delta YI_3$ between the yellowness index $YI_3'$ in observation from the oblique direction and the yellowness index $YI_3$ in observation from the front direction of the entire liquid crystal display device was evaluated. Specifically, CIE tristimulus values $X_{on}$, $Y_{on}$, and $Z_{on}$ of the liquid crystal display device 1R in the front view (polar angle: 0°) and CIE tristimulus values $X_{off}$, $Y_{off}$ and $Z_{off}$ thereof in an oblique view (azimuth: 45°, polar angle: 60°) were calculated with an LCD Master (Version 9.9) available from Shintech Co., Ltd. The CIE tristimulus values X, Y, and Z are standard values defined by the International Commission on Illumination (CIE). The azimuth (azimuth angle) was defined to be 0° in the x-axis direction on the xy-plane in FIG. 6 and to have positive values in the counterclockwise direction. The polar angle was defined to be 0° in the z-axis direction on the xz-plane in FIG. 6 and to have positive values in the clockwise direction.

The obtained CIE tristimulus values were used for calculation of the yellowness index that is an index representing the degree of yellowness in conformity with the standard defined in JIS K7373 (2006), according to the formula: yellowness index $YI=100\times(1.2985\times X-1.1335\times Z)/Y$. The yellowness index in observation from the front direction (yellowness index in a front view) was represented by $YI_3$ ($YI_{on}$), and the yellowness index in observation from the oblique direction (yellowness index in an oblique view) was represented by $YI_3'$ ($YI_{off}$). The yellowness index YI shows that a greater positive value represents a stronger yellow tinge and a greater negative value represents a stronger blue tinge.

Next, the difference (amount of change) between the yellowness index $YI_3$ in observation from the front direction and the yellowness index $YI_3'$ in observation from the oblique direction was calculated according to the formula: $\Delta YI_3=YI_3'-YI_3$. The difference value $\Delta YI_3$ was 6.7. This means that the screen of the typical FFS mode liquid crystal display device (liquid crystal display device of Comparative Example 1) appears yellower in an oblique view than in the front view.

Comparative Example 2

Figure 7:
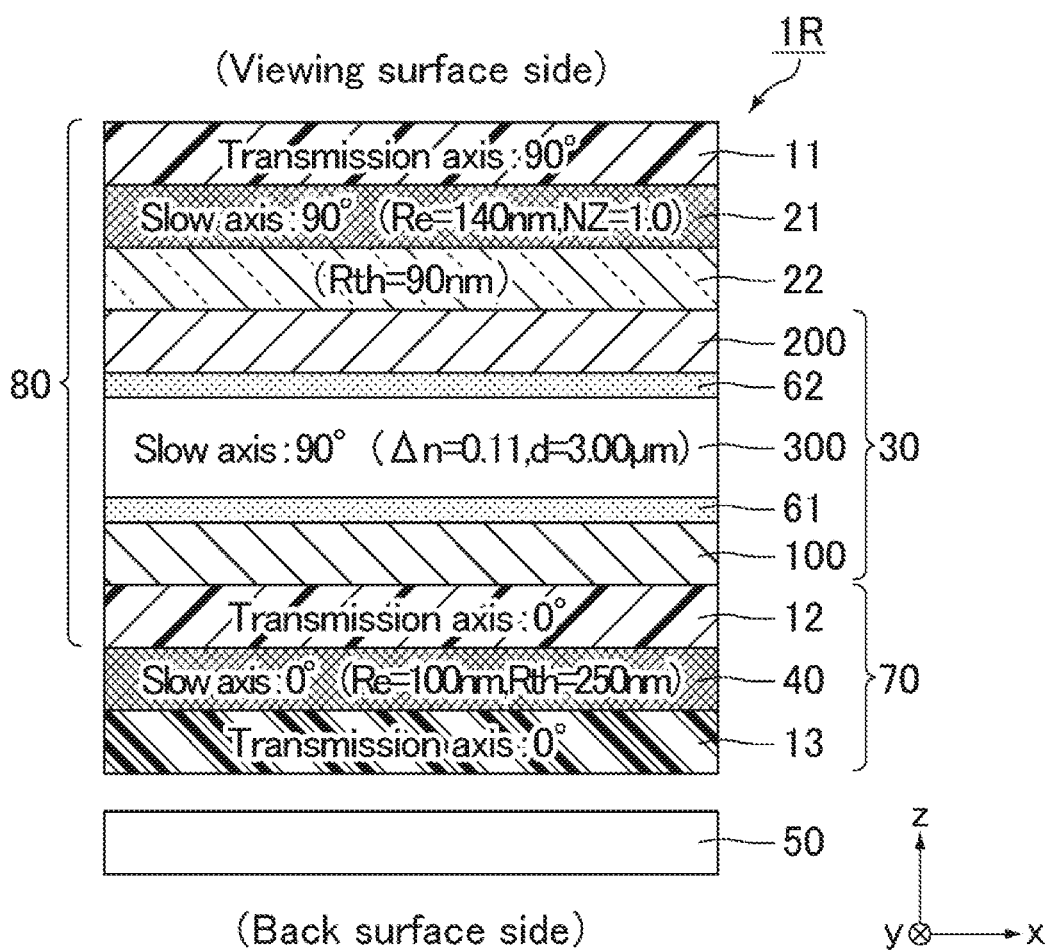
FIG. 7 is a schematic cross-sectional view of a liquid crystal display device according to Comparative Example 2.

FIG. 7 is a schematic cross-sectional view of a liquid crystal display device according to Comparative Example 2. The angles shown in FIG. 7 represent axis azimuths. A liquid crystal display device 1R of Comparative Example 2 shown in FIG. 7 was produced as in Comparative Example 1 except that the liquid crystal display device included the back surface side biaxial retarder 40. The liquid crystal panel 30 had the same structure as in Comparative Example 1 as shown in FIGS. 2 to 5. The back surface side biaxial retarder 40 of Comparative Example 2 was formed from a cycloolefin polymer, had an in-plane retardation Re of 100 nm, a thickness retardation Rth of 250 nm, and an NZ coefficient of 3.0. In Comparative Example 2, the azimuth of the first transmission axis of the first polarizer 11, the azimuth of the slow axis of the viewing surface side biaxial retarder 21, and the azimuth of the slow axis of the liquid crystal layer 300 were each 90°, and the azimuth of the second transmission axis of the second polarizer 12, the azimuth of the slow axis of the back surface side biaxial retarder 40, and the azimuth of the third transmission axis of the third polarizer 13 were each 0°. The liquid crystal display device of Comparative Example 2 had the same structure as that of JP 2013-130882 A.

Similarly to Comparative Example 1, the difference value $\Delta YI_3$ of the entire liquid crystal display device was evaluated. In the same manner as with the difference value $\Delta YI_3$ of the entire liquid crystal display device, the liquid crystal panel portion 80 including the first polarizer 11, the viewing surface side biaxial retarder 21, the positive C plate 22, the liquid crystal panel 30, and the second polarizer 12 was evaluated for the difference value $\Delta YI_1$ between the yellowness index $YI_1'$ in observation from the oblique direction and the yellowness index $YI_1$ in observation from the front direction. In the same manner as with the difference value $\Delta YI_3$ of the entire liquid crystal display device, the back side polarizer portion 70 including the second polarizer 12, the back surface side biaxial retarder 40, and the third polarizer 13, was evaluated for the difference value $\Delta YI_2$ between the yellowness index $YI_2'$ in observation from the oblique direction and the yellowness index $YI_2$ in observation from the front direction.

The difference value $\Delta YI_1$ of the liquid crystal panel portion 80 was 6.7, the difference value $\Delta YI_2$ of the back side polarizer portion 70 was 21.9, and the difference value $\Delta YI_3$ of the entire liquid crystal display device was 26.1. In the liquid crystal display device 1R of Comparative Example 2, the back surface side biaxial retarder 40 had too large an NZ coefficient. Thus, significant yellow discoloration was observed in an oblique view of the back side polarizer portion 70, resulting in more significant yellow discoloration of the entire liquid crystal display device than in Comparative Example 1.

Examples 1-1 to 1-4 and Comparative Examples 1R-1 to 1R-3

Figure 8:
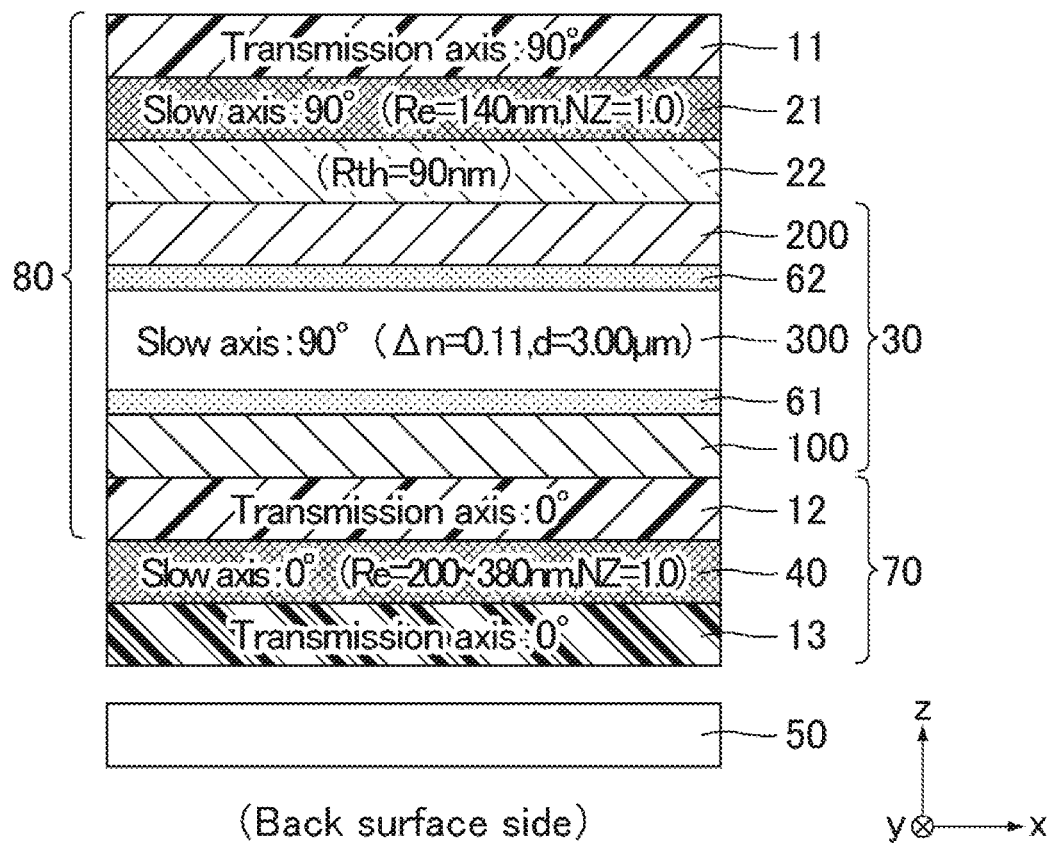
FIG. 8 is a schematic cross-sectional view of each of liquid crystal display devices according to Examples 1-1 to 1-4 and Comparative Examples 1R-1 to 1R-3.

FIG. 8 is a schematic cross-sectional view of each of liquid crystal display devices according to Examples 1-1 to 1-4 and Comparative Examples 1R-1 to 1R-3. The angles shown in FIG. 8 represent axis azimuths. The liquid crystal display devices of Examples 1-1 to 1-4 and Comparative Examples 1R-1 to 1R-3 as shown in FIG. 8 were each produced as in Comparative Example 2, except that the back surface side biaxial retarder 40 had a different in-plane retardation Re, a different thickness retardation Rth, and a different NZ coefficient. The liquid crystal panel 30 had the same structure as in Comparative Example 1 as shown in FIGS. 2 to 5.

Each of the back surface side biaxial retarders 40 of Examples 1-1 to 1-4 and Comparative Examples 1R-1 to 1R-3 was appropriately controlled to have an in-plane retardation Re within the range of 200 nm to 380 nm as shown in Table 1, and the thickness retardation Rth was adjusted such that the NZ coefficient was 1.0.

In each of the liquid crystal display devices of Examples 1-1 to 1-4 and Comparative Examples 1R-1 to 1R-3, the difference value $\Delta YI_1$ of the liquid crystal panel portion 80, the difference value $\Delta YI_2$ of the back side polarizer portion 70, and the difference value $\Delta YI_3$ of the entire liquid crystal display device were evaluated. The results are shown in the following Table 1.

In each of the liquid crystal display devices of Examples 1-1 to 1-4, the back side polarizer portion 70 had a negative difference value $\Delta YI_2$ that was able to offset the difference value $\Delta YI_1$ (positive value) of the liquid crystal panel portion 80, whereby yellow discoloration of the liquid crystal display device was successfully reduced. Specifically, in each of the liquid crystal display devices of Examples 1-1 to 1-4, the entire liquid crystal display device had a difference value $\Delta YI_3$ of less than 6.7 to achieve less yellow discoloration in an oblique view than the typical FFS mode liquid crystal display device of Comparative Example 1. Also, in each of the liquid crystal display devices of Examples 1-1 to 1-4, the entire liquid crystal display device had an absolute value of less than 6.7 for the difference value $\Delta YI_3$ to achieve reduced blue tinge as well as reduced yellow discoloration.

Examples 2-1 to 2-5 and Comparative Examples 2R-1 to 2R-3

Figure 9:
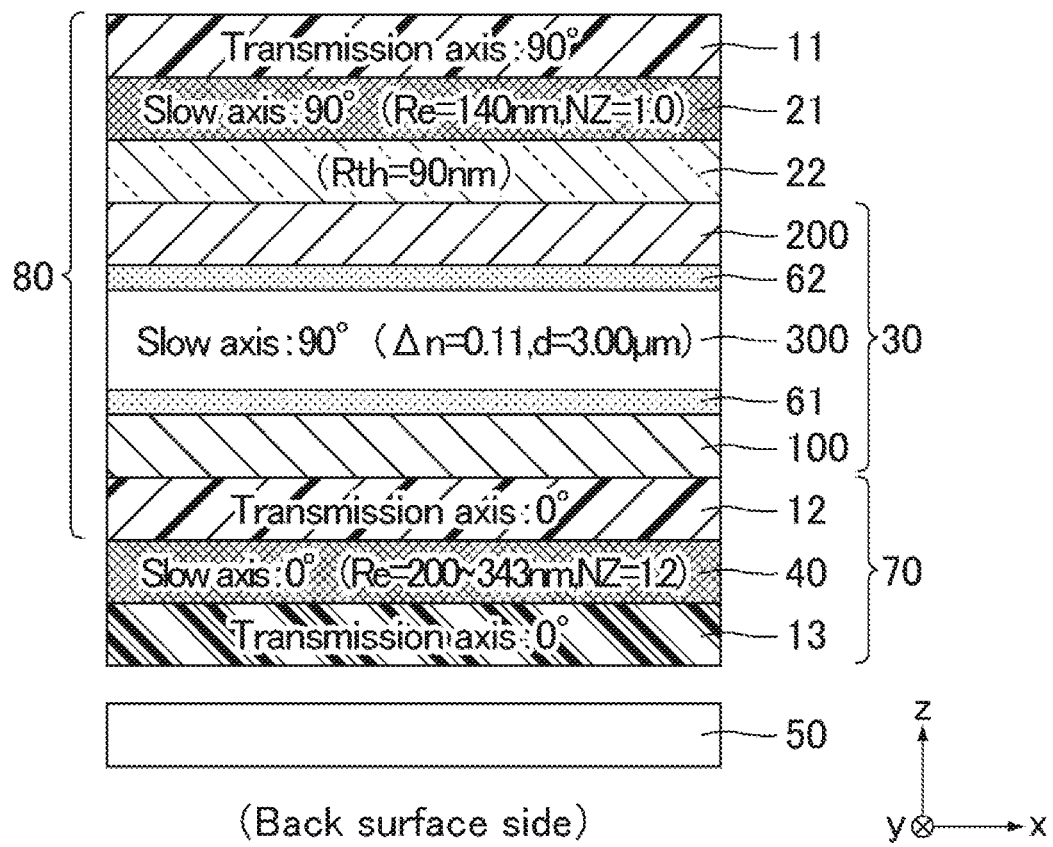
FIG. 9 is a schematic cross-sectional view of each of liquid crystal display devices according to Examples 2-1 to 2-5 and Comparative Examples 2R-1 to 2R-3.

FIG. 9 is a schematic cross-sectional view of each of liquid crystal display devices according to Examples 2-1 to 2-5 and Comparative Examples 2R-1 to 2R-3. The angles shown in FIG. 9 represent axis azimuths. The liquid crystal display devices of Examples 2-1 to 2-5 and Comparative Examples 2R-1 to 2R-3 shown in FIG. 9 were each produced as in Comparative Example 2 except that the back surface side biaxial retarder 40 had a different in-plane retardation Re, a different thickness retardation Rth, and a different NZ coefficient. The liquid crystal panel 30 had the same structure as in Comparative Example 1 as shown in FIGS. 2 to 5.

Each of the back surface side biaxial retarders 40 of Examples 2-1 to 2-5 and Comparative Examples 2R-1 to 2R-3 was appropriately controlled to have an in-plane retardation Re within the range of 200 nm to 343 nm as shown in Table 2, and the thickness retardation Rth was adjusted such that the NZ coefficient was 1.2.

In each of the liquid crystal display devices of Examples 2-1 to 2-5 and Comparative Examples 2R-1 to 2R-3, the difference value $\Delta YI_1$ of the liquid crystal panel portion 80, the difference value $\Delta YI_2$ of the back side polarizer portion 70, and the difference value $\Delta YI_3$ of the entire liquid crystal display device were evaluated. The results are shown in the following Table 2.

TABLE 1

| | In-plane retardation Re (nm) | Thickness retardation Rth (nm) | NZ coefficient | (I) Liquid crystal panel portion $\Delta YI_1$ | (II) Back side polarizer portion $\Delta YI_2$ | (III) Entire liquid crystal display device $\Delta YI_3$ |
|---|---|---|---|---|---|---|
| Comparative Example 1R-1 | 200 | 100 | 1.0 | 6.7 | 3.1 | 9.5 |
| Comparative Example 1R-2 | 220 | 110 | 1.0 | 6.7 | 2.2 | 8.8 |
| Comparative Example 1R-3 | 240 | 120 | 1.0 | 6.7 | 1.0 | 7.7 |
| Example 1-1 | 260 | 130 | 1.0 | 6.7 | −0.5 | 6.4 |
| Example 1-2 | 280 | 140 | 1.0 | 6.7 | −2.2 | 4.9 |
| Example 1-3 | 300 | 150 | 1.0 | 6.7 | −3.9 | 3.3 |
| Example 1-4 | 380 | 190 | 1.0 | 6.7 | −14.7 | −6.6 |

TABLE 2

| | In-plane retardation Re (nm) | Thickness retardation Rth (nm) | NZ coefficient | (I) Liquid crystal panel portion $\Delta YI_1$ | (II) Back side polarizer portion $\Delta YI_2$ | (III) Entire liquid crystal display device $\Delta YI_3$ |
|---|---|---|---|---|---|---|
| Comparative Example 2R-1 | 200 | 140 | 1.2 | 6.7 | 4.2 | 10.5 |
| Comparative Example 2R-2 | 220 | 154 | 1.2 | 6.7 | 2.9 | 9.4 |
| Comparative Example 2R-3 | 240 | 168 | 1.2 | 6.7 | 1.0 | 7.7 |
| Example 2-1 | 250 | 175 | 1.2 | 6.7 | −0.2 | 6.6 |
| Example 2-2 | 260 | 182 | 1.2 | 6.7 | −1.4 | 5.6 |
| Example 2-3 | 280 | 196 | 1.2 | 6.7 | −4.0 | 3.3 |
| Example 2-4 | 300 | 210 | 1.2 | 6.7 | −6.6 | 1.0 |
| Example 2-5 | 343 | 240 | 1.2 | 6.7 | −13.9 | −6.6 |

In each of the liquid crystal display devices of Examples 2-1 to 2-5, the back side polarizer portion 70 had a negative difference value $\Delta YI_2$ that was able to offset the difference value $\Delta YI_1$ (positive value) of the liquid crystal panel portion 80, whereby yellow discoloration of the liquid crystal display device was successfully reduced. Specifically, in each of the liquid crystal display devices of Examples 2-1 to 2-5, the entire liquid crystal display device had a difference value $\Delta YI_3$ of less than 6.7 to achieve less yellow discoloration in an oblique view than the typical FFS mode liquid crystal display device of Comparative Example 1. Also, in each of the liquid crystal display devices of Examples 2-1 to 2-5, the entire liquid crystal display device had an absolute value of less than 6.7 for the difference value $\Delta YI_3$ to achieve reduced blue tinge as well as reduced yellow discoloration.

Examples 3-1 to 3-5 and Comparative Examples 3R-1 to 3R-3

Figure 10:
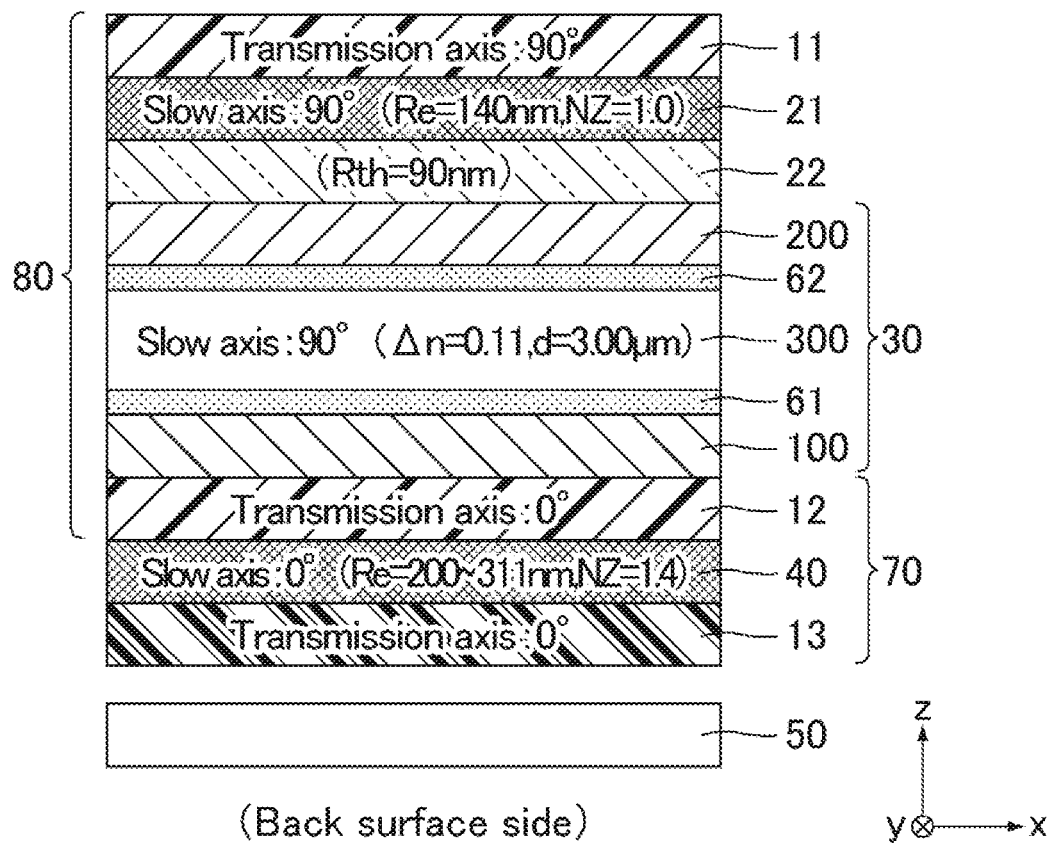
FIG. 10 is a schematic cross-sectional view of each of liquid crystal display devices according to Examples 3-1 to 3-5 and Comparative Examples 3R-1 to 3R-3.

FIG. 10 is a schematic cross-sectional view of each of liquid crystal display devices according to Examples 3-1 to 3-5 and Comparative Examples 3R-1 to 3R-3. The angles shown in FIG. 10 represent axis azimuths. The liquid crystal display devices of Examples 3-1 to 3-5 and Comparative Examples 3R-1 to 3R-3 shown in FIG. 10 were each produced as in Comparative Example 2 except that the back surface side biaxial retarder 40 had a different in-plane retardation Re, a different thickness retardation Rth, and a different NZ coefficient. The liquid crystal panel 30 had the same structure as in Comparative Example 1 as shown in FIGS. 2 to 5.

Each of the back surface side biaxial retarders 40 of Examples 3-1 to 3-5 and Comparative Examples 3R-1 to 3R-3 was appropriately controlled to have an in-plane retardation Re within the range of 200 nm to 311 nm as shown in Table 3, and the thickness retardation Rth was adjusted such that the NZ coefficient was 1.4.

In each of the liquid crystal display devices of Examples 3-1 to 3-5 and Comparative Examples 3R-1 to 3R-3, the difference value $\Delta YI_1$ of the liquid crystal panel portion 80, the difference value $\Delta YI_2$ of the back side polarizer portion 70, and the difference value $\Delta YI_3$ of the entire liquid crystal display device were evaluated. The results are shown in the following Table 3.

TABLE 3

| | In-plane retardation Re (nm) | Thickness retardation Rth (nm) | NZ coefficient | (I) Liquid crystal panel portion $\Delta YI_1$ | (II) Back side polarizer portion $\Delta YI_2$ | (III) Entire liquid crystal display device $\Delta YI_3$ |
|---|---|---|---|---|---|---|
| Comparative Example 3R-1 | 200 | 180 | 1.4 | 6.7 | 5.4 | 11.6 |
| Comparative Example 3R-2 | 220 | 198 | 1.4 | 6.7 | 3.3 | 9.8 |
| Comparative Example 3R-3 | 240 | 216 | 1.4 | 6.7 | 0.3 | 7.2 |
| Example 3-1 | 244 | 220 | 1.4 | 6.7 | −0.5 | 6.6 |
| Example 3-2 | 260 | 234 | 1.4 | 6.7 | −3.2 | 4.1 |
| Example 3-3 | 280 | 252 | 1.4 | 6.7 | −7.0 | 0.8 |
| Example 3-4 | 300 | 270 | 1.4 | 6.7 | −10.6 | −2.5 |
| Example 3-5 | 311 | 280 | 1.4 | 6.7 | −13.2 | −6.6 |

In each of the liquid crystal display devices of Examples 3-1 to 3-5, the back side polarizer portion 70 had a negative difference value $\Delta YI_2$ that was able to offset the difference value $\Delta YI_1$ (positive value) of the liquid crystal panel portion 80, whereby yellow discoloration of the liquid crystal display device was successfully reduced. Specifically, in each of the liquid crystal display devices of Examples 3-1 to 3-5, the entire liquid crystal display device had a difference value $\Delta YI_3$ of less than 6.7 to achieve less yellow discoloration in an oblique view than the typical FFS mode liquid crystal display device of Comparative Example 1. Also, in each of the liquid crystal display devices of Examples 3-1 to 3-5, the entire liquid crystal display device had an absolute value of less than 6.7 for the difference value $\Delta YI_3$ to achieve reduced blue tinge as well as reduced yellow discoloration.

Examples 4-1 to 4-6 and Comparative Examples 4R-1 and 4R-2

Figure 11:
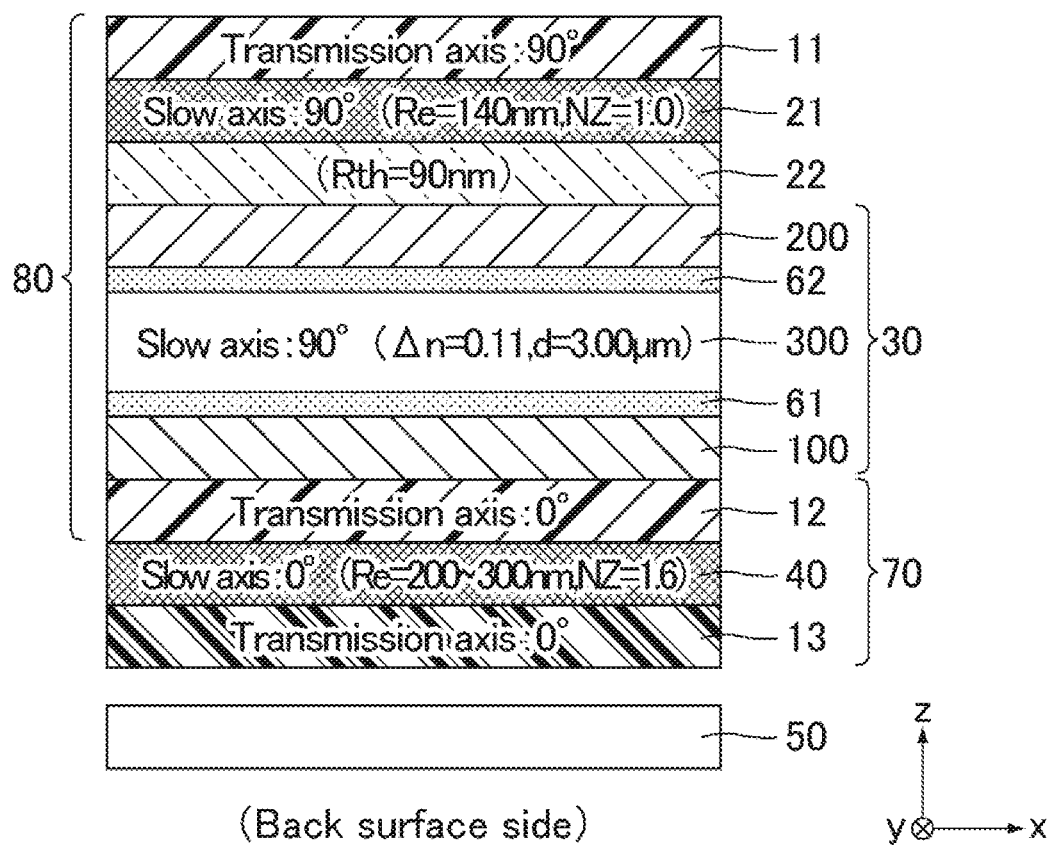
FIG. 11 is a schematic cross-sectional view of each of liquid crystal display devices according to Examples 4-1 to 4-6 and Comparative Examples 4R-1 and 4R-2.

FIG. 11 is a schematic cross-sectional view of each of liquid crystal display devices according to Examples 4-1 to 4-6 and Comparative Examples 4R-1 and 4R-2. The angles shown in FIG. 11 represent axis azimuths. The liquid crystal display devices of Examples 4-1 to 4-6 and Comparative Examples 4R-1 and 4R-2 shown in FIG. 11 were each produced as in Comparative Example 2 except that the back surface side biaxial retarder 40 had a different in-plane retardation Re, a different thickness retardation Rth, and a different NZ coefficient. The liquid crystal panel 30 had the same structure as in Comparative Example 1 as shown in FIGS. 2 to 5.

Each of the back surface side biaxial retarders 40 of Examples 4-1 to 4-6 and Comparative Examples 4R-1 and 4R-2 was appropriately controlled to have an in-plane retardation Re within the range of 200 nm to 300 nm as shown in Table 4, and the thickness retardation Rth was adjusted such that the NZ coefficient was 1.6.

In each of the liquid crystal display devices of Examples 4-1 to 4-6 and Comparative Examples 4R-1 and 4R-2, the difference value $\Delta YI_1$ of the liquid crystal panel portion 80, the difference value $\Delta YI_2$ of the back side polarizer portion 70, and the difference value $\Delta YI_3$ of the entire liquid crystal display device were evaluated. The results are shown in the following Table 4.

yellow discoloration in an oblique view than the typical FFS mode liquid crystal display device of Comparative Example 1. Also, in each of the liquid crystal display devices of Examples 4-1 to 4-5, the entire liquid crystal display device had an absolute value of less than 6.7 for the difference value $\Delta YI_3$ to achieve reduced blue tinge as well as reduced yellow discoloration.

Examples 5-1 to 5-6 and Comparative Examples 5R-1 and 5R-2

Figure 12:
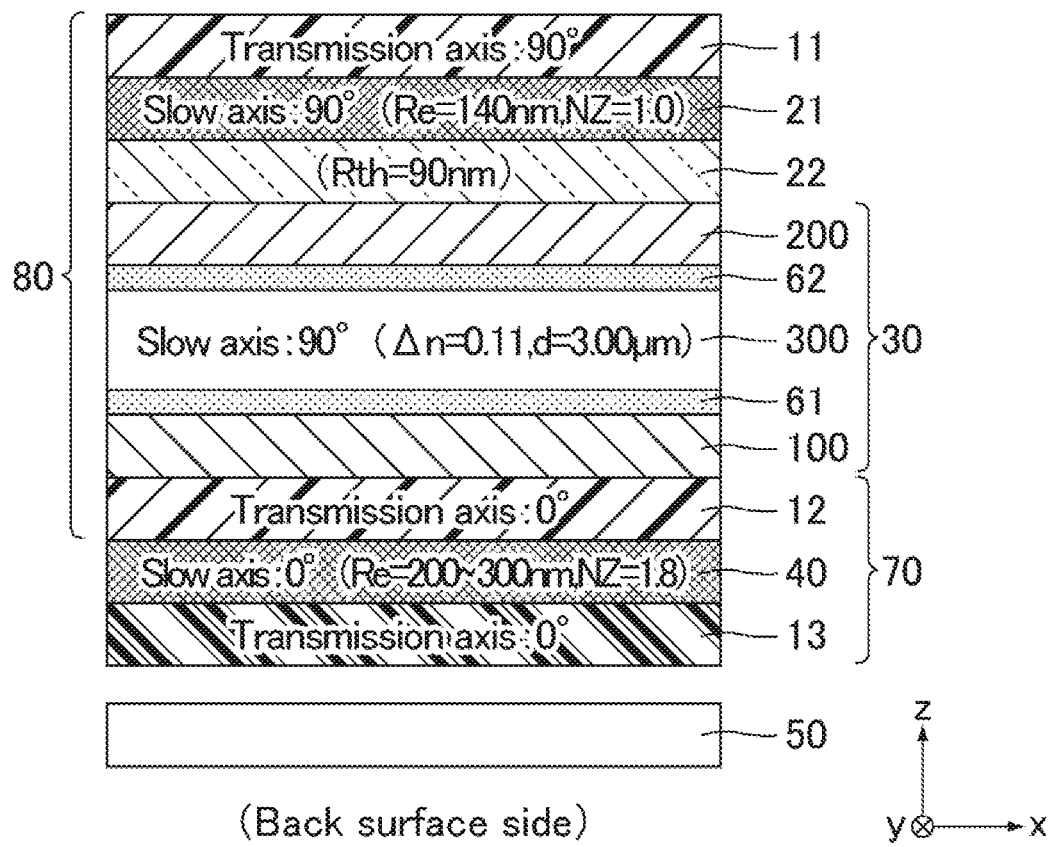
FIG. 12 is a schematic cross-sectional view of each of liquid crystal display devices according to Examples 5-1 to 5-6 and Comparative Examples 5R-1 and 5R-2.

FIG. 12 is a schematic cross-sectional view of each of liquid crystal display devices according to Examples 5-1 to 5-6 and Comparative Examples 5R-1 and 5R-2. The angles shown in FIG. 12 represent axis azimuths. The liquid crystal display devices of Examples 5-1 to 5-6 and Comparative Examples 5R-1 and 5R-2 shown in FIG. 12 were each produced as in Comparative Example 2 except that the back surface side biaxial retarder 40 had a different in-plane retardation Re, a different thickness retardation Rth, and a different NZ coefficient. The liquid crystal panel 30 had the same structure as in Comparative Example 1 as shown in FIGS. 2 to 5.

Each of the back surface side biaxial retarders 40 of Examples 5-1 to 5-6 and Comparative Examples 5R-1 and 5R-2 was appropriately controlled to have an in-plane retardation Re within the range of 200 nm to 300 nm as

TABLE 4

| | In-plane retardation Re (nm) | Thickness retardation Rth (nm) | NZ coefficient | (I) Liquid crystal panel portion $\Delta YI_1$ | (II) Back side polarizer portion $\Delta YI_2$ | (III) Entire liquid crystal display device $\Delta YI_3$ |
|---|---|---|---|---|---|---|
| Comparative Example 4R-1 | 200 | 220 | 1.6 | 6.7 | 7.0 | 13.1 |
| Comparative Example 4R-2 | 220 | 242 | 1.6 | 6.7 | 3.7 | 10.3 |
| Example 4-1 | 236 | 260 | 1.6 | 6.7 | −0.1 | 6.6 |
| Example 4-2 | 240 | 264 | 1.6 | 6.7 | −0.7 | 6.4 |
| Example 4-3 | 260 | 286 | 1.6 | 6.7 | −5.9 | 1.9 |
| Example 4-4 | 280 | 308 | 1.6 | 6.7 | −11.1 | −2.8 |
| Example 4-5 | 295 | 325 | 1.6 | 6.7 | −14.8 | −6.6 |
| Example 4-6 | 300 | 330 | 1.6 | 6.7 | −15.8 | −7.0 |

In each of the liquid crystal display devices of Examples 4-1 to 4-6, the back side polarizer portion 70 had a negative difference value $\Delta YI_2$ that was able to offset the difference value $\Delta YI_1$ (positive value) of the liquid crystal panel portion 80, whereby yellow discoloration of the liquid crystal display device was successfully reduced. Specifically, in each of the liquid crystal display devices of Examples 4-1 to 4-6, the entire liquid crystal display device had a difference value $\Delta YI_3$ of less than 6.7 to achieve less shown in Table 5, and the thickness retardation Rth was adjusted such that the NZ coefficient was 1.8.

In each of the liquid crystal display devices of Examples 5-1 to 5-6 and Comparative Examples 5R-1 and 5R-2, the difference value $\Delta YI_1$ of the liquid crystal panel portion 80, the difference value $\Delta YI_2$ of the back side polarizer portion 70, and the difference value $\Delta YI_3$ of the entire liquid crystal display device were evaluated. The results are shown in the following Table 5.

TABLE 5

| | In-plane retardation Re (nm) | Thickness retardation Rth (nm) | NZ coefficient | (I) Liquid crystal panel portion $\Delta YI_1$ | (II) Back side polarizer portion $\Delta YI_2$ | (III) Entire liquid crystal display device $\Delta YI_3$ |
|---|---|---|---|---|---|---|
| Comparative Example 5R-1 | 200 | 260 | 1.8 | 6.7 | 7.7 | 13.8 |
| Comparative Example 5R-2 | 220 | 286 | 1.8 | 6.7 | 2.8 | 9.6 |
| Example 5-1 | 231 | 300 | 1.8 | 6.7 | −1.3 | 6.6 |
| Example 5-2 | 240 | 312 | 1.8 | 6.7 | −3.7 | 3.9 |
| Example 5-3 | 260 | 338 | 1.8 | 6.7 | −10.8 | −2.4 |

TABLE 5-continued

|  | In-plane retardation Re (nm) | Thickness retardation Rth (nm) | NZ coefficient | (I) Liquid crystal panel portion $\Delta YI_1$ | (II) Back side polarizer portion $\Delta YI_2$ | (III) Entire liquid crystal display device $\Delta YI_3$ |
|---|---|---|---|---|---|---|
| Example 5-4 | 277 | 360 | 1.8 | 6.7 | −15.8 | −6.6 |
| Example 5-5 | 280 | 364 | 1.8 | 6.7 | −17.5 | −8.4 |
| Example 5-6 | 300 | 390 | 1.8 | 6.7 | −22.8 | −13.3 |

In each of the liquid crystal display devices of Examples 5-1 to 5-6, the back side polarizer portion 70 had a negative difference value $\Delta YI_2$ that was able to offset the difference value $\Delta YI_1$ (positive value) of the liquid crystal panel portion 80, whereby yellow discoloration of the liquid crystal display device was successfully reduced. Specifically, in each of the liquid crystal display devices of Examples 5-1 to 5-6, the entire liquid crystal display device had a difference value $\Delta YI_3$ of less than 6.7 to achieve less yellow discoloration in an oblique view than the typical FFS mode liquid crystal display device of Comparative Example 1. Also, in each of the liquid crystal display devices of Examples 5-1 to 5-4, the entire liquid crystal display device had an absolute value of less than 6.7 for the difference value $\Delta YI_3$ to achieve reduced blue tinge as well as reduced yellow discoloration.

Examples 6-1 to 6-6 and Comparative Examples 6R-1 and 6R-2

Figure 13:
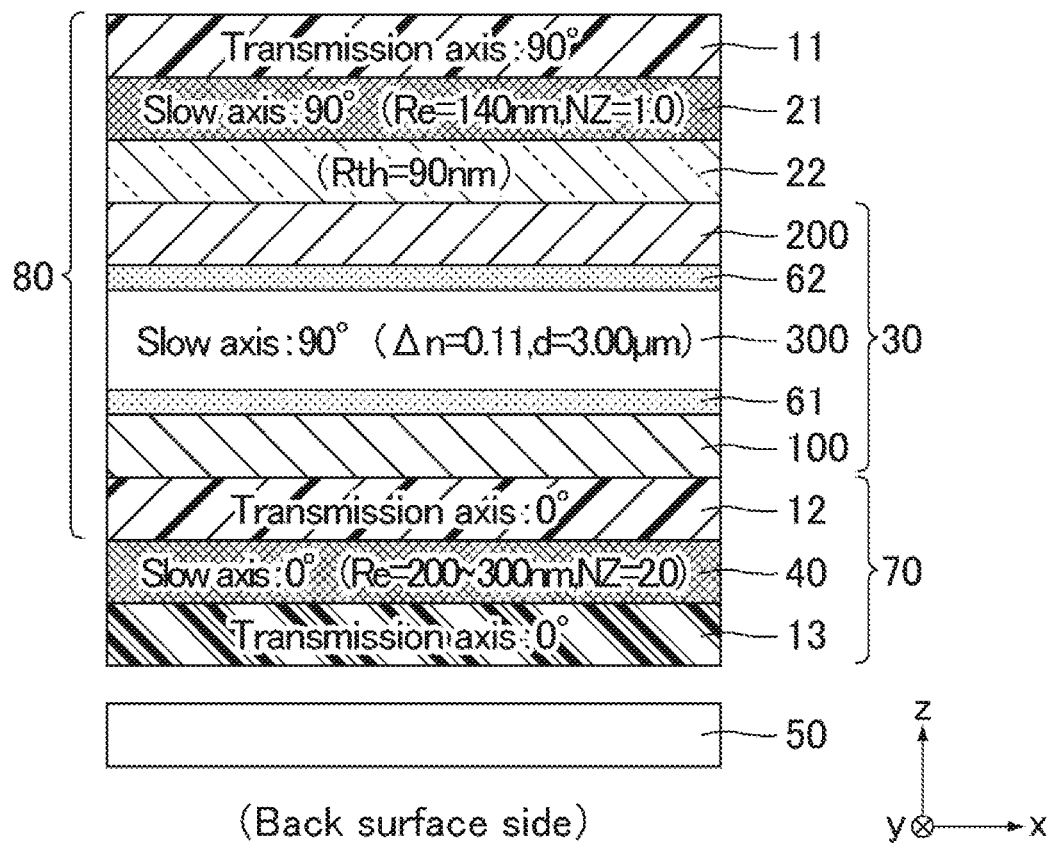
FIG. 13 is a schematic cross-sectional view of each of liquid crystal display devices according to Examples 6-1 to 6-6 and Comparative Examples 6R-1 and 6R-2.

FIG. 13 is a schematic cross-sectional view of each of liquid crystal display devices according to Examples 6-1 to 6-6 and Comparative Examples 6R-1 and 6R-2. The angles shown in FIG. 13 represent axis azimuths. The liquid crystal display devices of Examples 6-1 to 6-6 and Comparative Examples 6R-1 and 6R-2 shown in FIG. 13 were each produced as in Comparative Example 2 except that the back surface side biaxial retarder 40 had a different in-plane retardation Re, a different thickness retardation Rth, and a different NZ coefficient. The liquid crystal panel 30 had the same structure as in Comparative Example 1 as shown in FIGS. 2 to 5.

Each of the back surface side biaxial retarders 40 of Examples 6-1 to 6-6 and Comparative Examples 6R-1 and 6R-2 was appropriately controlled to have an in-plane retardation Re within the range of 200 nm to 300 nm as shown in Table 6, and the thickness retardation Rth was adjusted such that the NZ coefficient was 2.0.

In each of the liquid crystal display devices of Examples 6-1 to 6-6 and Comparative Examples 6R-1 and 6R-2, the difference value $\Delta YI_1$ of the liquid crystal panel portion 80, the difference value $\Delta YI_2$ of the back side polarizer portion 70, and the difference value $\Delta YI_3$ of the entire liquid crystal display device were evaluated. The results are shown in the following Table 6.

TABLE 6

|  | In-plane retardation Re (nm) | Thickness retardation Rth (nm) | NZ coefficient | (I) Liquid crystal panel portion $\Delta YI_1$ | (II) Back side polarizer portion $\Delta YI_2$ | (III) Entire liquid crystal display device $\Delta YI_3$ |
|---|---|---|---|---|---|---|
| Comparative Example 6R-1 | 200 | 300 | 2.0 | 6.7 | 7.6 | 13.9 |
| Comparative Example 6R-2 | 220 | 330 | 2.0 | 6.7 | 0.3 | 7.6 |
| Example 6-1 | 223 | 335 | 2.0 | 6.7 | −2.3 | 6.6 |
| Example 6-2 | 240 | 360 | 2.0 | 6.7 | −8.8 | −0.4 |
| Example 6-3 | 250 | 375 | 2.0 | 6.7 | −13.5 | −6.6 |
| Example 6-4 | 260 | 390 | 2.0 | 6.7 | −18.0 | −8.7 |
| Example 6-5 | 280 | 420 | 2.0 | 6.7 | −25.8 | −15.8 |
| Example 6-6 | 300 | 450 | 2.0 | 6.7 | −30.9 | −20.6 |

In each of the liquid crystal display devices of Examples 6-1 to 6-6, the back side polarizer portion 70 had a negative difference value $\Delta YI_2$ that was able to offset the difference value $\Delta YI_1$ (positive value) of the liquid crystal panel portion 80, whereby yellow discoloration of the liquid crystal display device was successfully reduced. Specifically, in each of the liquid crystal display devices of Examples 6-1 to 6-6, the entire liquid crystal display device had a difference value $\Delta YI_3$ of less than 6.7 to achieve less yellow discoloration in an oblique view than the typical FFS mode liquid crystal display device of Comparative Example 1. Also, in each of the liquid crystal display devices of Examples 6-1 to 6-3, the entire liquid crystal display device had an absolute value of less than 6.7 for the difference value $\Delta YI_3$ to achieve reduced blue tinge as well as reduced yellow discoloration.

Evaluation of Example 3-2 and Comparative Example 1

Figure 15:
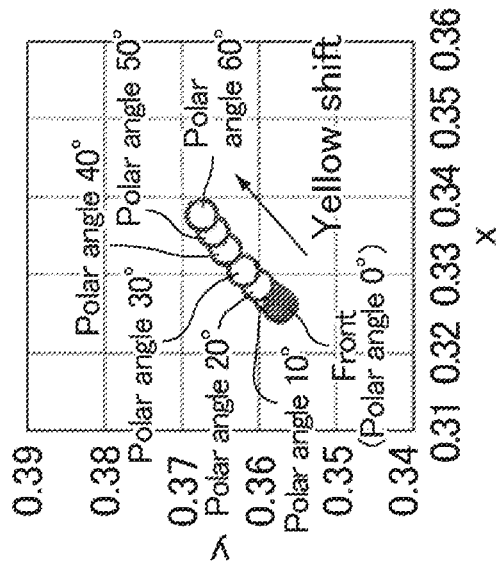
FIG. 15 is a graph showing polar angle dependence of chromaticity in 45°-azimuth observation of an entire liquid crystal display device of Comparative Example 1.

FIG. 14 includes graphs showing polar angle dependence of chromaticity in 45°-azimuth observation of the liquid crystal panel portion, the back side polarizer portion, and the entire portion of the liquid crystal display device of Example 3-2. FIG. 15 is a graph showing polar angle dependence of chromaticity in 45°-azimuth observation of the entire liquid crystal display device of Comparative Example 1. The coordinates (x, y) in FIG. 14 and FIG. 15 correspond to chromaticities of CIE1931 color space defined by the International Commission on Illumination. As shown in FIG. 14, in observation of the liquid crystal display device of Example 3-2 from the oblique direction at a 60° polar angle and a 45° azimuth, the yellow shift caused by liquid crystal panel portion was able to be offset by the blue shift caused by the back side polarizer portion, whereby the tinge could be neutralized as the entire liquid crystal display device. In contrast, in the liquid crystal display device of Comparative Example 1, a yellow shift was observed from oblique directions as shown in FIG. 15.

(Derivation of Formula (6-1) to Formula (6-3))

Figure 16:
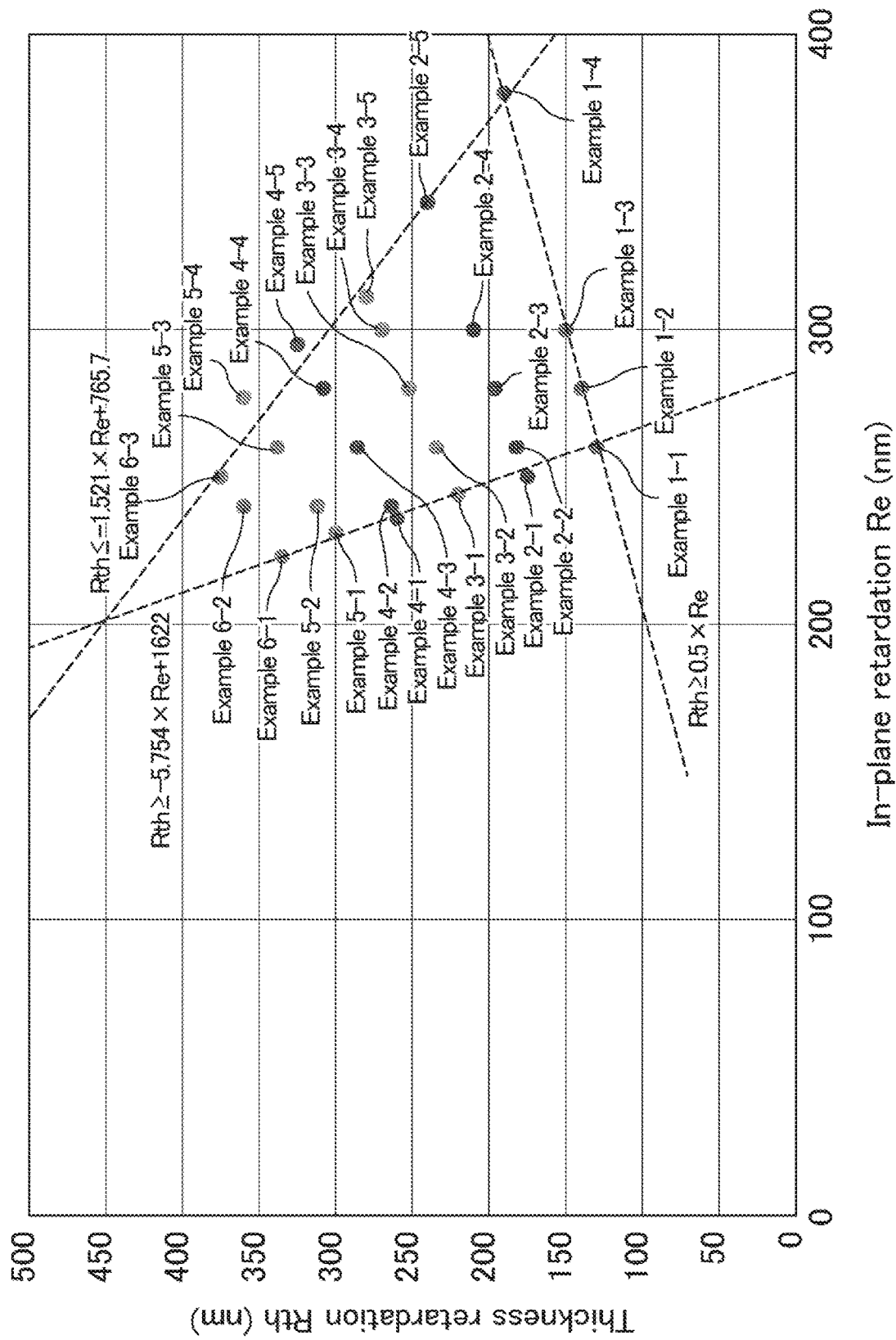
FIG. 16 is a plot of relation between thickness retardations Rth's and in-plane retardations Re's concerning the liquid crystal display devices of Examples 1-1 to 1-4, 2-1 to 2-5, 3-1 to 3-5, 4-1 to 4-5, 5-1 to 5-4, and 6-1 to 6-3.

FIG. 16 is a plot of relation between thickness retardations Rth's and in-plane retardations Re's concerning the liquid crystal display devices of Examples 1-1 to 1-4, 2-1 to 2-5, 3-1 to 3-5, 4-1 to 4-5, 5-1 to 5-4, and 6-1 to 6-3. In each of Examples 1-1 to 1-4, 2-1 to 2-5, 3-1 to 3-5, 4-1 to 4-5, 5-1 to 5-4, and 6-1 to 6-3 in which the difference value $\Delta YI_3$ of the entire liquid crystal display device had an absolute value of less than 6.7, the relation between the in-plane retardation Re and the thickness retardation Rth was plotted. The region surrounded by the triangle shown in FIG. 16 was considered as an effective range where the difference value $\Delta YI_3$ of the entire liquid crystal display device had an absolute value of less than 6.7. The three sides of the triangle were represented by formulas using Re and Rth, whereby the formulas (6-1) to (6-3) were derived.

REFERENCE SIGNS LIST 1, 1R: liquid crystal display device
1W, L, S: width
11: first polarizer
12: second polarizer
13: third polarizer
21: viewing surface side biaxial retarder
22: positive C plate
30: liquid crystal panel
40: back surface side biaxial retarder
50: backlight
61: first alignment film
62: second alignment film
70: back side polarizer portion
80: liquid crystal panel portion
100: thin-film transistor (TFT) substrate
101: gate line
101G: gate electrode
102: source line
102D: drain electrode
102S: source electrode
103: thin-film semiconductor layer
104: thin-film transistor (TFT)
104CH: contact hole
110, 210: support substrate
120: gate insulator
130: source line layer
140: source insulating film
150, 240: flattening film
160: common electrode
170: interlayer insulating film
170W: film thickness
180: pixel electrode (signal electrode)
200: color filter (CF) substrate
220: black matrix layer
230: color filter layer
230B: blue color filter
230G: green color filter
230R: red color filter
300: liquid crystal layer
300W: cell gap

What is claimed is:

1. A liquid crystal display device sequentially comprising from a viewing surface side to a back surface side:
   a first polarizer having a first transmission axis;
   a liquid crystal panel;
   a second polarizer having a second transmission axis;
   a biaxial retarder having a slow axis parallel to the second transmission axis;
   a third polarizer having a third transmission axis parallel to the second transmission axis; and
   a backlight,
   a back side polarizer portion that includes the second polarizer, the biaxial retarder, and the third polarizer satisfying the following formula (1):

$$\Delta YI_2 = YI_2' - YI_2 < 0 \tag{1}$$

wherein $YI_2'$ represents a yellowness index in observation from an oblique direction, $YI_2$ represents a yellowness index in observation from a front direction, and $\Delta YI_2$ represents a difference between $YI_2'$ and $YI_2$,
   wherein the front direction represents a direction at a 0° polar angle and the oblique direction represents a direction at a 60° polar angle and a 45° azimuth with the polar angle defined to be 0° in a direction parallel to a normal line of the liquid crystal panel and the azimuth defined to be 0° in a direction parallel to the slow axis of the biaxial retarder.

2. The liquid crystal display device according to claim 1, wherein a liquid crystal panel portion including the first polarizer, the liquid crystal panel, and the second polarizer satisfies the following formula (2):

$$\Delta YI_1 = YI_1' - YI_1 > 0 \tag{2}$$

wherein $YI_1'$ represents a yellowness index in observation from the oblique direction, $YI_1$ represents a yellowness index in observation from the front direction, and $\Delta YI_1$ represents a difference between $YI_1'$ and $YI_1$.

3. The liquid crystal display device according to claim 2, wherein the liquid crystal panel has an in-plane retardation of 330 nm or more.

4. The liquid crystal display device according to claim 1, wherein the liquid crystal display device satisfies the following formula (3):

$$\Delta YI_3 = YI_3' - YI_3 < 6.7 \tag{3}$$

wherein $YI_3'$ represents a yellowness index in observation from the oblique direction, $YI_3$ represents a yellowness index in observation from the front direction, and $\Delta YI_3$ represents a difference between $YI_3'$ and $YI_3$.

5. The liquid crystal display device according to claim 4, wherein the difference value $\Delta YI_3$ satisfies the following formula (4):

$$|\Delta YI_3| = |YI_3' - YI_3| < 6.7 \tag{4}$$

6. The liquid crystal display device according to claim 1, wherein a ratio Re450/Re550 representing a ratio of an in-plane retardation Re of the biaxial retarder at a wavelength of 450 nm to an in-plane retardation Re thereof at a wavelength of 550 nm satisfies the following formula (5-1),
   a ratio Re650/Re550 representing a ratio of an in-plane retardation Re of the biaxial retarder at a wavelength of 650 nm to an in-plane retardation Re thereof at a wavelength of 550 nm satisfies the following formula (5-2), and an in-plane retardation Re (mn) of the biaxial retarder and a thickness retardation Rth (nm) thereof satisfy the following formulas (6-1) to (6-3),
the formulas being:

$$1.00 < Re450/Re550 < 1.02 \quad (5\text{-}1)$$

$$0.98 < Re650/Re550 < 1.00 \quad (5\text{-}2)$$

$$Rth \geq -5.754 \times Re + 1622 \quad (6\text{-}1)$$

$$Rth \geq 0.5 \times Re \quad (6\text{-}2)$$

$$Rth \leq -1.521 \times Re + 765.7 \quad (6\text{-}3).$$

* * * * *